United States Patent
Drottar et al.

(10) Patent No.: US 6,170,025 B1
(45) Date of Patent: Jan. 2, 2001

(54) DISTRIBUTED COMPUTER SYSTEM SUPPORTING REMOTE INTERRUPTS AND LOCK MECHANISM

(75) Inventors: Ken Drottar; David S. Dunning; William T. Futral, all of Portland, OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/132,324

(22) Filed: Aug. 11, 1998

Related U.S. Application Data

(60) Provisional application No. 60/057,221, filed on Aug. 29, 1997, and provisional application No. 60/081,220, filed on Apr. 9, 1998.

(51) Int. Cl.[7] ............................... G06F 3/00; G06F 5/00
(52) U.S. Cl. ................................... 710/48; 710/2; 710/5; 710/30; 710/101; 710/105; 710/108; 710/126; 710/129; 710/260; 710/268; 709/217; 709/218; 709/219; 709/201
(58) Field of Search ............................... 710/2, 5, 30, 48, 710/101, 105, 108, 126, 129, 260, 268; 709/201, 217–219

(56) References Cited

U.S. PATENT DOCUMENTS

| | | | |
|---|---|---|---|
| 5,193,189 | * | 3/1993 | Flood et al. . |
| 5,859,980 | * | 1/1999 | Kalkunte ........................ 395/200.61 |
| 5,915,104 | * | 6/1999 | Miller ................................... 710/129 |
| 5,933,413 | * | 8/1999 | Merchant et al. ................... 370/234 |
| 5,953,511 | * | 9/1999 | Sescila, III et al. ................. 710/129 |

* cited by examiner

Primary Examiner—Ayaz R. Sheikh
Assistant Examiner—Rupal D. Dharia
(74) Attorney, Agent, or Firm—R. Edward Brake

(57) ABSTRACT

A distributed computer system includes a host CPU, a network/host bridge, a network/I/O bridge and one or more I/O devices. The host CPU can generate a locked host transaction, which is wrapped in a packet and transmitted over a network to the remote I/O device for replay. The remote I/O devices can generate interrupts. The interrupt is wrapped in a packet and transmitted to the host computer for replay as an interrupt. The host CPU then executes the appropriate interrupt service routine to process the interrupt routine. The remote location of the I/O device with respect to the host CPU is transparent to the CPU and I/O devices. The bridges perform wrapping and unwrapping of host and I/O transactions for transmission across a network.

16 Claims, 11 Drawing Sheets

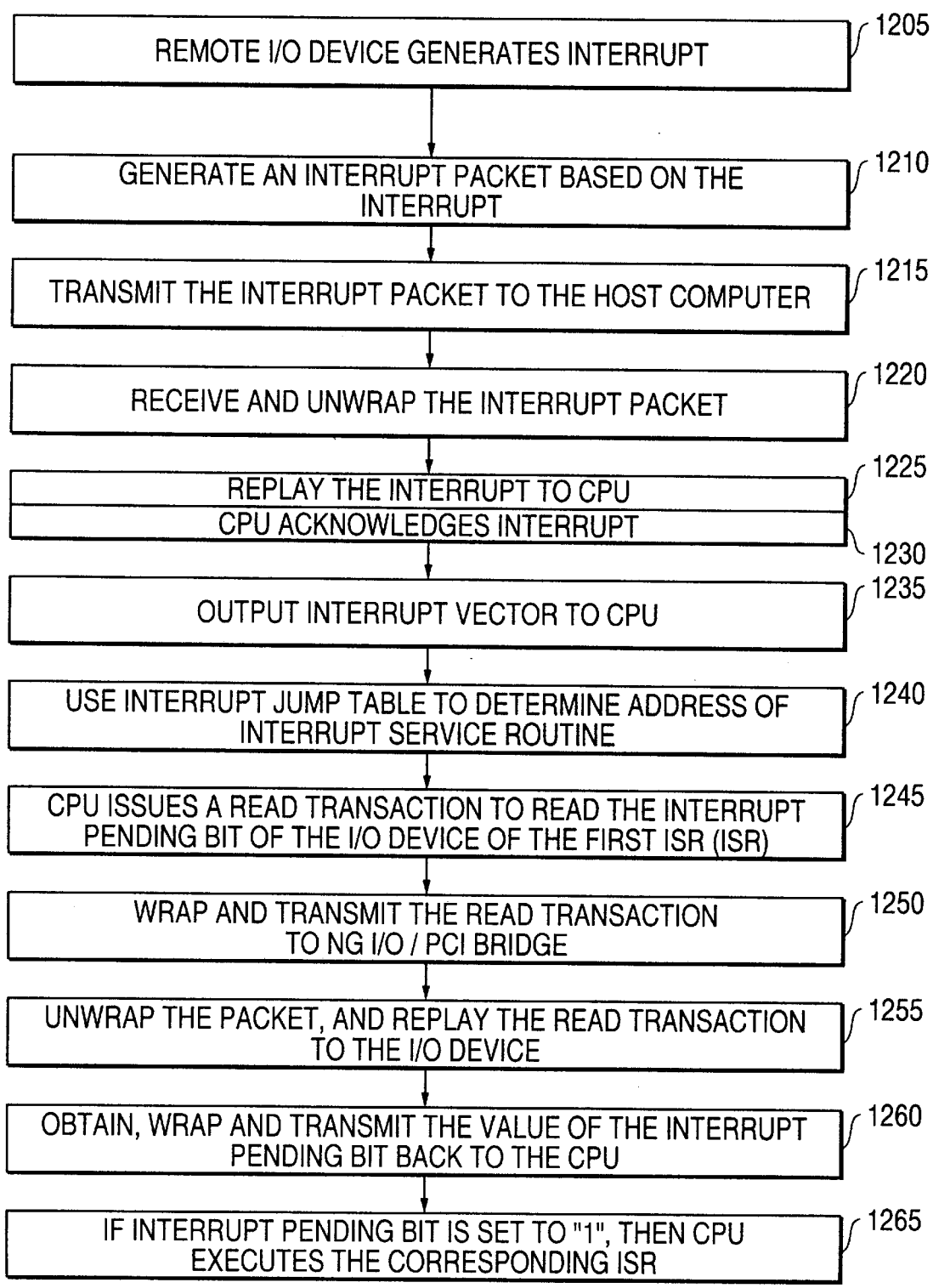

DISTRIBUTED COMPUTER SYSTEM SUPPORTING REMOTE INTERRUPTS AND LOCK MECHANISM

CROSS-REFERENCE TO RELATED APPLICATIONS

This application is based upon U.S. Provisional application Ser. No. 60/057,221 filed on Aug. 29, 1997, entitled "Method and Apparatus For Communicating Between Interconnected Computers, Storage Systems, And Other Input/Output Subsystems," incorporated herein by reference, and U.S. Provisional application Ser. No. 60/081,220 filed on Apr. 9, 1998, entitled "Next Generation Input/Output," also incorporated herein by reference.

BACKGROUND OF THE INVENTION

The present invention relates generally to computers, and more particularly to communications between interconnected computer nodes, storage subsystems, and other network devices.

Assessments of server and I/O technologies and their respective marketplaces make clear that cluster communications, including server-to-server communications and server-to-I/O communications, will be increasingly based on a distributed model. Existing server architectures, based on a shared-address-space model, bus-oriented connections to I/O devices and I/O transactions based on a load/store memory model, have limitations.

FIG. 1 illustrates a block diagram of a current generation computer, including CPUs 105 and 110 connected to a host bus 111. CPU 105 is connected to a cache 106 and CPU 110 is connected to a cache 108. The system also includes main memory 109, and one or two host/PCI bridges 112 and 115. Host/PCI bridges 112, 115 convert transactions between host bus 111 and a Peripheral Component Interconnect (PCI) bus 113. A storage controller 324 and several I/O devices 120, 122 and 124 are connected to PCI bus 113. I/O devices 326 are also connected to storage controller 324.

There are limitations on the number of electrical loads which may be placed on the host bus 111. Moreover, these configurations are also limited by the PCI bus 113, which imposes limits both on the number of electrical loads it is capable of supporting and the physical distances at which devices can be placed. As illustrated in FIG. 1, storage connectivity and proximity are typically restricted to what fits within a single enclosure.

An architecture for I/O pass through of the present invention overcomes some of the disadvantages and limitations of prior art computer systems by increasing the number of I/O devices that can be connected to a computer system, by increasing the distance at which the I/O devices are located, and by permitting a more distributed architecture. The distributed computer system of the present invention increases the number of I/O devices and the distance at which they are coupled to host computers, while retaining some of the features of current I/O buses, such as PCI.

SUMMARY OF THE INVENTION

According to an embodiment of the present invention, a method of executing a locked transaction over a distributed computer system to a remotely located I/O resource is provided. The distributed computer system includes a host computer and a remotely located I/O resource. The method includes the steps of detecting a locked host transaction on a host computer that is targeted to a remotely located I/O resource, wrapping the locked transaction in a packet for transmission over a network. The packet includes a field indicating that the transaction is locked. The method also includes the steps of transmitting the packet over the network to the remote I/O device, unwrapping the packet received at the I/O device, converting the locked host transaction to a locked I/O transaction and determining if the targeted resource is already locked by another host. In addition, if the targeted I/O resource is not locked by another host computer, then the locked transaction is replayed to the targeted I/O resource.

According to another embodiment of the present invention, a method of processing a remote interrupt in a distributed computer system is provided. The distributed computer system includes a host computer and a plurality of remotely located I/O devices. The method includes the steps of generating an interrupt at one of the remote I/O devices, wrapping and transporting the interrupt to the host computer, unwrapping and replaying the interrupt to the host computer and generating, wrapping and transmitting one or more host read transactions to one or more remote I/O devices in response to the replayed interrupt. In addition, the method includes he steps of unwrapping and replaying the read transactions to the one or more remote I/O devices, obtaining information identifying the I/O device that generated the interrupt and wrapping and transmitting the information identifying the I/O device that generated the interrupt to the host computer. The method also includes the step of executing an interrupt service routine associated with the I/O device that generated the interrupt based on the information identifying the I/O device.

BRIEF DESCRIPTION OF THE DRAWINGS

FIG. 12 is a flow chart illustrating the processing of a remote interrupt according to an embodiment of the present invention.

DETAILED DESCRIPTION

Introduction

Figure 1:
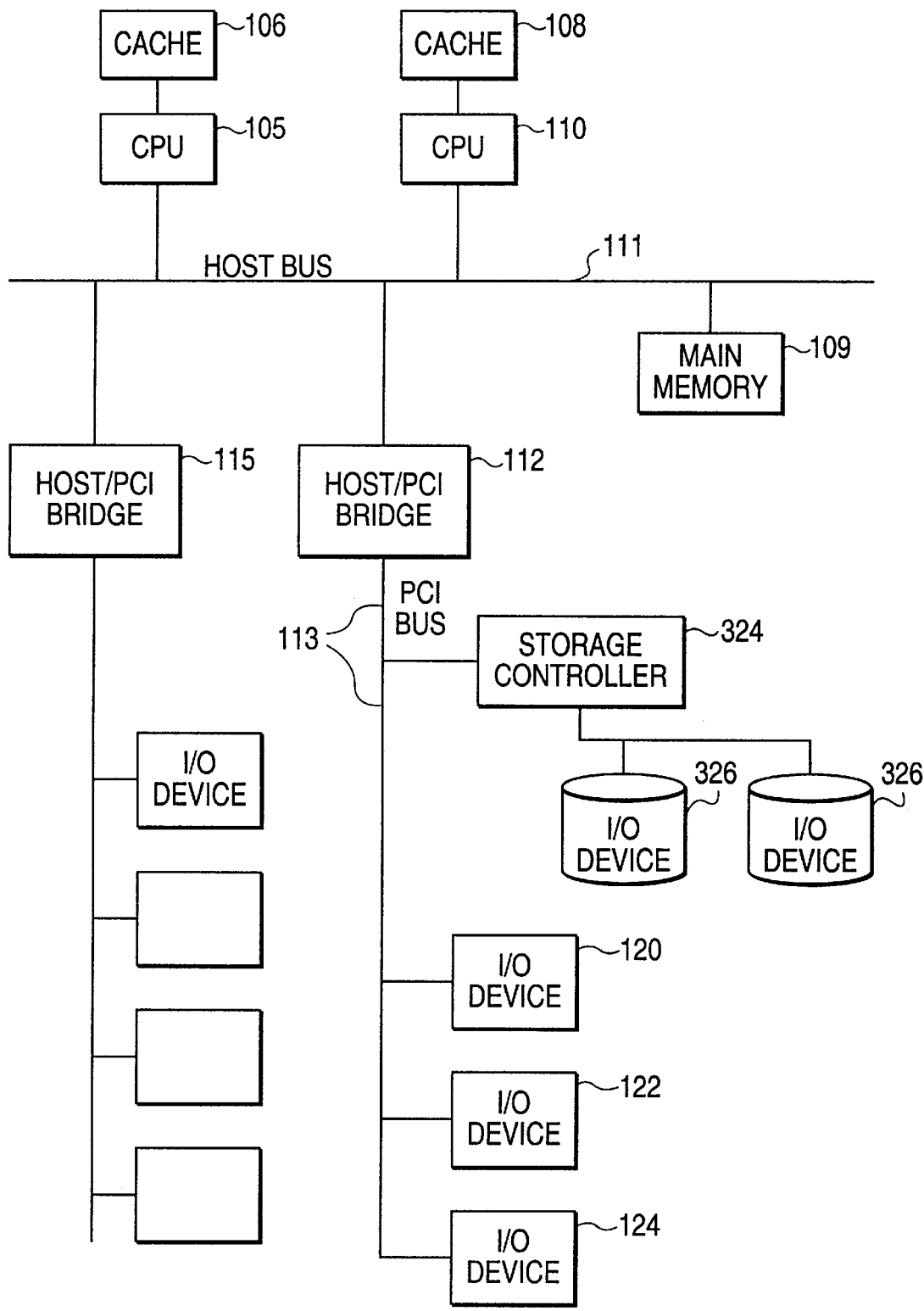
FIG. 1 illustrates a block diagram of a current generation computer.

The distributed computer system of the present invention allows host computers to remotely access one or more I/O systems. The fact that the I/O bus and I/O device are located remote from the host computer is transparent to the host CPU and the I/O device through two new types of bridges that allow transactions to be wrapped in a packet, sent over a network, and replayed at a remote location. According to an embodiment of the present invention, the two new bridges include a NG I/O/host bridge and a NG I/O/PCI bridge. These bridges perform the wrapping and unwrapping of transaction information into packets, and the conversion of received address and control signals from one type of transaction to another (e.g., host transactions and PCI transactions), thereby permitting a distributed arrangement of host computers and I/O systems. The present invention provides the convenience of remote I/O access while maintaining compatibility with current CPU commands, drivers and I/O devices and standards (e.g., compatible with the PCI interface).

A remote lock feature of the present invention allows a remote resource to be locked as if the resource were local by setting a Lock field in a transaction header of the packet to Lock. A transaction to a resource that is locked is treated as an undeliverable packet. The undeliverable packet is sent back to the source with locked resource retry condition appended to the MAC. The source of the granted lock releases the destination memory resource by setting the Lock field to Unlock in the transaction header of the final locked transaction.

Similarly, the remote interrupt feature of the present invention permits a remotely located I/O device to interrupt a host CPU (request service). The interrupt is received and an interrupt packet is generated and transmitted over the fabric to the host computer. The interrupt is replayed and the host computer executes an appropriate interrupt service routine.

Architectural Overview

NG I/O Architecture is a general term to describe systems that are based on the concepts of NG I/O and that employ and NG I/O fabric. The NG I/O fabric is the set of wires and switches that allow two NG I/O devices to communicate. The NG I/O fabric is a standard interface designed to connect server nodes into a cluster and to connect various I/O devices such as storage devices, bridges, and network interfaces. One or more NG I/O "switches," together with a series of links, comprise a "fabric".

An NG I/O link is the wires used to interconnect two points and the accompanying protocol that runs over those wires. The term NG I/O is the chosen acronym for "Next Generation Input/Output." I/O pass through is a method of connecting I/O devices to a computer node, or connecting two computer nodes together, based on load/store memory transactions. An interconnect based on I/O pass through is said to be transparent to the entities at either end of the interconnect. NG I/O (physical) is the minimum set of wires and the protocol that runs on them link that interconnect two entities. For example, the wires and protocol connecting a computer node to a switch comprise a link. NG I/O bundled refers to the capability to connect two or more NG I/O links link together in parallel. Such bundled links can be used to gain increased bandwidth or improve the overall reliability of a given link. NIC refers to a Network Interface Card. NG I/O means Next Generation Input/Output. Switch means an NG I/O device that is capable of receiving NG I/O packets (also referred to as I/O packets) through one or more ports and re-transmitting those packets through another port based on a destination address contained in the packet. In network terms, a switch typically operates at the data link layer.

Figure 2:
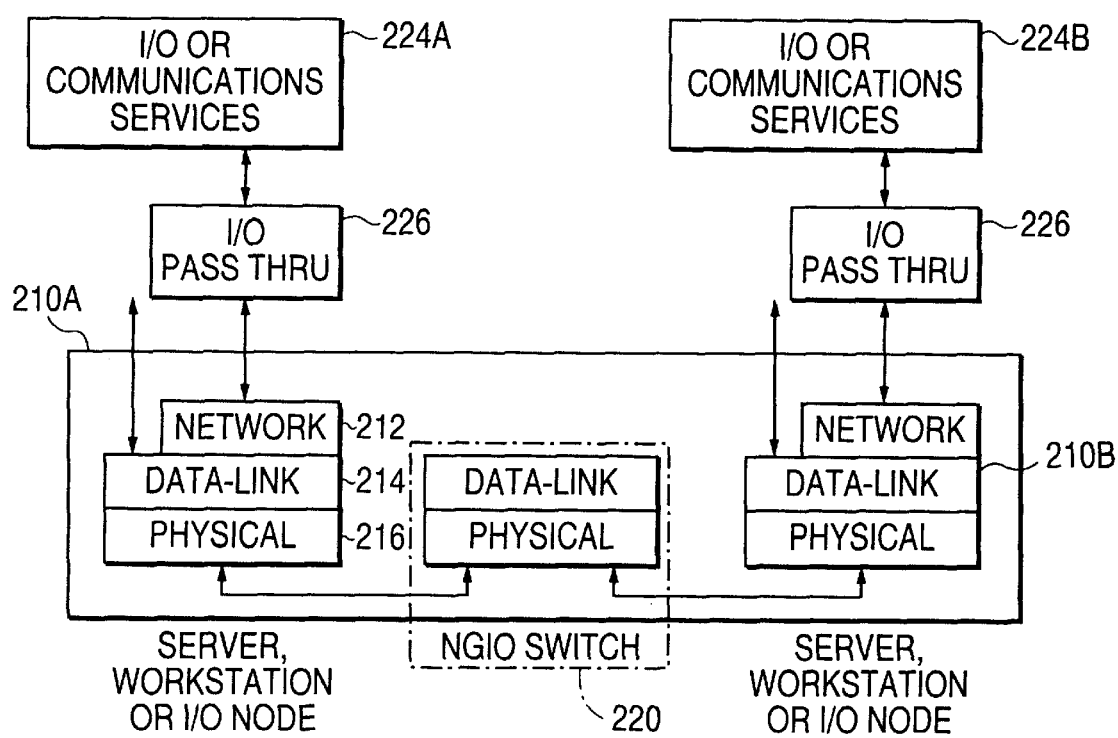
FIG. 2 illustrates the overall NG I/O link architecture according to an embodiment of the present invention.

FIG. 2 illustrates the overall NG I/O link architecture according to an embodiment of the present invention. The overall NG I/O link architecture can be illustrated as including one or more host computers 210 (e.g., servers, workstations, personal computers, or the like), including computers 210A and 210B. The host computers 210 communicate with each other via a (switched) NG I/O fabric that may include a layered architecture, including a network layer 212, a data link layer 214 and a physical layer 216. An NG I/O switch 220 (e.g., including data link 214 and physical layers 216) interconnects the host computers 210A and 210B. Each host computer 210 can communicate with one or more I/O devices 224 (224A and 224B) via the NG I/O fabric using, for example, an I/O pass through technique 226 according to an embodiment of the present invention and described in greater detail below. Thus, the system of FIG. 2 may therefore be considered a distributed computer system because the host computers 210 may be remotely located from the I/O devices 224.

Figure 3:
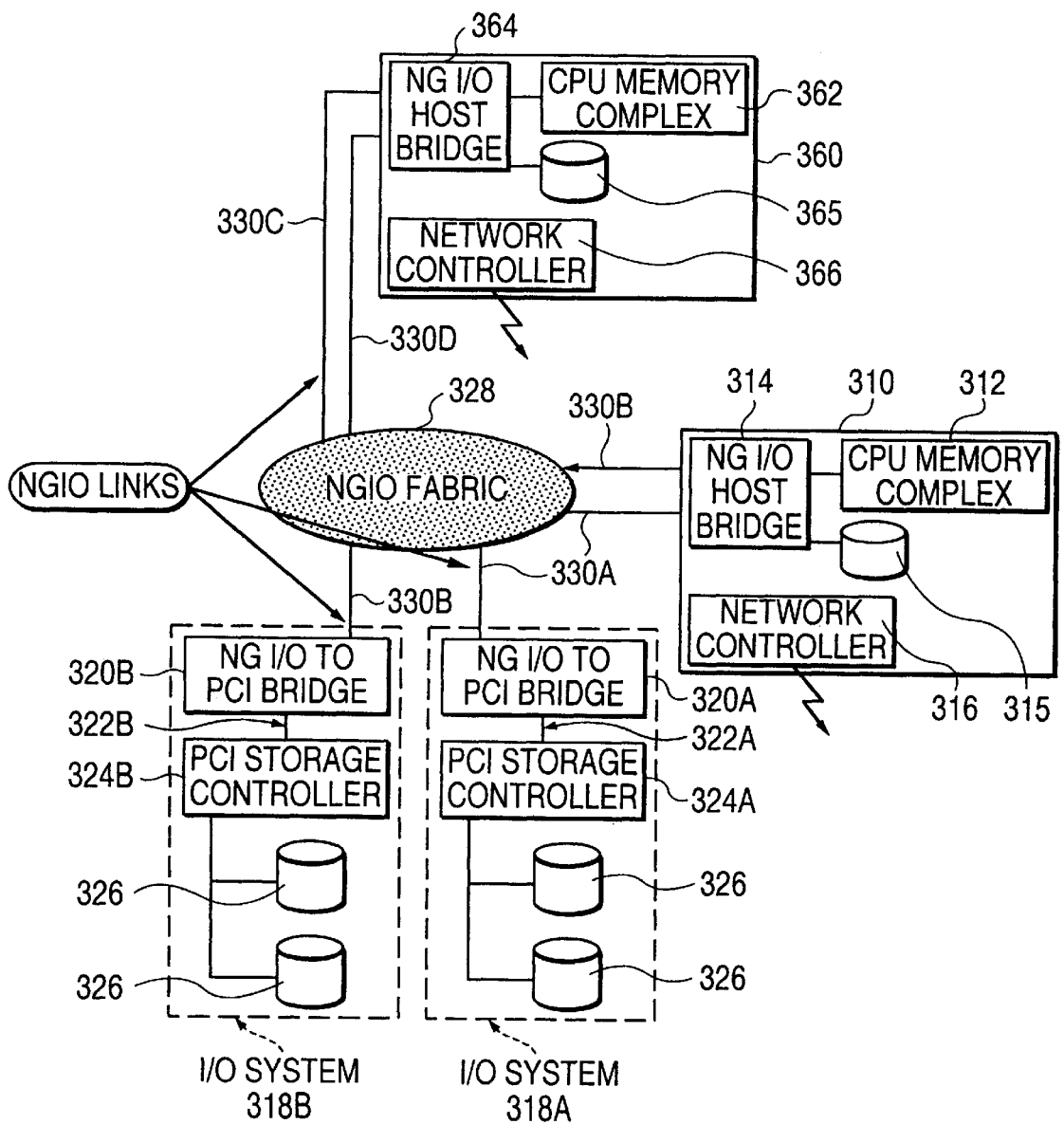
FIG. 3 is a block diagram of an NG I/O architecture for I/O pass through according to an embodiment of the present invention.

FIG. 3 is a block diagram of an NGO I/O architecture for I/O pass through according to an embodiment of the present invention. The NGO I/O architecture includes multiple host computers, including a host computer 310 and a host computer 360, each which may be a server, workstation, personal computer (PC) or other computer. Host computers 310 and 360 are each interconnected to I/O systems 318A and 318B via a (switched) NGO I/O fabric 328, including one or more NGO I/O links (e.g., NGO I/O links 330A 330B, 330C, 330D). As a result, I/O systems 318 can be remotely located from computers 310 and 360 via fabric 328. Host computers 310, 360, NG I/O fabric 328 and the I/O systems 318 may comprise a System Area Network (SAN). Other host computers and I/O systems (not shown) may also be connected to fabric 328.

Computer 310 includes a CPU/memory complex 312 (including a CPU and main memory typically interconnected via a host bus, not shown), an NG I/O/host bridge 314, secondary memory 315 (such as a hard disk drive), and a network controller 316. For outbound transactions (e.g., information being sent from computer 310 to an I/O system 318), NGO I/O host bridge 314 operates to wrap the host transaction in a NGO I/O packet for transmission over the NGO I/O fabric 328. For inbound transactions (e.g., information being sent from an I/O system 318 to computer 310), NG I/O/host bridge 314 operates to unwrap NG I/O packets (which include data and other transaction information) provided over fabric 328, and then convert the transaction information to a host transaction for replay at computer 310. Like computer 310, computer 360 includes a CPU/memory complex 362, NG I/O/host bridge 364, a secondary memory 365, and a network controller 366. Computer 360 operates in a similar manner to computer 310.

Each I/O system 318 includes an NG I/O/PCI Bridge 320, a PCI storage controller 324 coupled to the NG I/O/PCI bridge 320 via a PCI bus 322, and one or more I/O devices 326. (As illustrated in FIG. 3, the A suffix identifies components for I/O system 318A, and the B suffix indicates corresponding components of I/O system 318B). For outbound transactions, the NG I/O/PCI Bridge 320 operates to unwrap the data of a NG I/O packet received over the NG I/O fabric 328, and then convert the unwrapped data (e.g, a host transaction or data) to a PCI transaction for replay on the PCI bus 322. Likewise, for inbound transactions, NG I/O/PCI Bridge 320 operates to wrap the PCI transaction in a NG I/O packet for transmission over the NG I/O fabric 328 to computer 310.

PCI storage controller 324 operates to control and coordinate the transmission and reception of PCI transactions between PCI bus 322 and I/O devices 326. I/O devices 326 can include, for example, a SCSI storage device, or other I/O devices.

While the embodiment of the NG I/O architecture of the present invention illustrated in FIG. 3 includes a NG I/O/PCI bridge 320, it should be understood by those skilled in the art that other types of bridges can be used. For example, generically speaking, bridge 320 can be referred to as a "network to peripheral bridge" for converting network packets to and from a format that is compatible with I/O bus 322 (bus 322 may be a wide variety of types of I/O or peripheral buses, such as a PCI bus). Likewise, PCI storage controller 324 can be generically referred to as a "peripheral storage controller" for any of several types of I/O devices. Therefore, the present invention is not limited to PCI buses, but rather, is applicable to a wide variety of other I/O buses, such as Industry Standard Architecture (ISA), Extended Industry Standard Architecture (EISA), Accelerated Graphics Port (AGP), etc. PCI is merely used as an example to describe the principles of the present invention. Similarly, NG I/O to host bridge 364 can be generically referred to as a "network to host bridge" because it converts (NG I/O) network packets to and from a host format (host transactions).

FIG. 3 illustrates that an NG I/O fabric 328 can be used to move storage devices out of the server cabinet and place the storage devices remote from the computer 310. Fabric 328 can include one or more point-to-point links between computer 310 and each I/O system 318, or can include a number of point-to-point links interconnected by one or more switches. This architecture permits a more distributed environment than presently available.

Features of the NG I/O Fabric

Although not required, the following is a brief description of some desirable features of the NG I/O fabric and protocol according to an embodiment of the present invention.

An NG I/O system should be scalable in order to address the demands of a range of applications from very-large-scale distributed applications to smaller, more compact server applications. Scalability means that the system size can be increased or decreased in capacity to meet the needs of a variety of applications and environments with a commensurate change in performance. But to meet the needs of the marketplace, it should also be scalable over time, meaning that NG I/O must be able to take advantage of technology gains that occur over time. Furthermore, it should also encompass current generation I/O technologies as a means of providing a smooth migration path from today's bus-oriented I/O subsystems.

Large scale servers are generally required to meet high standards for reliability and availability. These high standards require that communications be reliable and predictable. To meet this requirement, reliability, availability, and serviceability considerations must be integrated into the design at the architectural level, with specific features of the fabric and protocol designed to increase reliability, availability, and serviceability.

Flexibility should be provided in the architecture of NG I/O to accommodate local I/O devices, network-attached I/O devices, network devices, and cluster connections for both existing and future server configurations. Flexibility also extends to accommodating existing generations of devices as well as next generation storage, network, and clustering solutions.

Scalability

Scalability is a key attribute for a server system since it is the cornerstone building block that allows a server system to be designed to meet the needs of a wide range of applications as well as serve a broad range of server market segments.

The NG I/O fabric allows for constructing server systems that are scalable in terms of throughput and connectivity. This allows future I/O subsystems to keep pace with microprocessor performance gains.

An NG I/O system is scalable in that overall throughput scales with the size of the system. This is achieved by transitioning away from a shared-bus architecture to a fabric-oriented system comprised of a series of point-to-point links interconnected by switch elements.

Scalability in connectivity means that it is possible to add additional devices to a subsystem beyond what is easily managed with today's PCI-based systems. NG I/O, which is based on a combination of serial links and switches, does not bear the burdens placed on a system by the physical requirements of PCI in terms of bus loading or signal-line lengths.

Reliability, Availability, and Serviceability

A system comprised of NG I/O-based components should have reliability, availability, and serviceability (RAS) as primary design goals. In addition, the design of the architecture must presupposed requirements for instrumentation and access to instrumentation or management and configuration purposes.

High availability and high reliability are achieved by paying careful consideration to RAS characteristics during the design of the architecture. This resulted in shaping certain facets of the architecture to help achieve the RAS goals.

These basic RAS features are described below:

Substantially all errors are detected and reported. The architecture provides for error detection to be handled by the protocol on a link-to-link basis.

Packet transactions can be retried, enabling the fabric to recover from certain link errors without software intervention. This means that each endpoint of each link participates in the error detection and retry algorithm, depending on implementation.

Flexible Architecture

One of the major challenges for server providers is to supply flexible I/O subsystems capable of covering a wide range of price, performance, and functionality. The NG I/O fabric supports systems from low-end file print servers up to high-end clustered applications servers. According to an embodiment of the present invention, it also supports a wide class of devices and types of connections including:

Direct attachment of legacy PCI devices, wherein existing devices can be connected to directly to a host node via a point-to-point NG I/O link, Network attachment of legacy PCI devices, allowing existing devices to connect to a switched NG I/O fabric, Inter-process communications (IPC) between servers, Attachment for storage devices, network devices, and system area network controllers.

The ability to interconnect a wide range of device types and computer nodes means that the NG I/O architecture is applicable for use in systems ranging from existing "one box" servers incorporating only a few storage and network device up to very large systems comprising clusters of large numbers of computer nodes sharing access to very large quantities of data and large numbers of network connections.

I/O Pass Through Operations

According to an embodiment of the present invention, the NG I/O architecture is based on "implicit transactions." In a multi processor, processes communicate implicitly using shared memory.

Implicit transactions are those in which the destination of a particular data or control operation is implied by the physical memory location with which the transaction is associated. The destination of the NG I/O transaction is implicitly specified by the memory operation. NG I/O routing information (e.g., a destination address in the packet header) is derived from the physical address (e.g., host memory address) generated by the processor. According to an embodiment of the present invention, there is a single memory-address space. (In other embodiments, multiple processors or host computers are connected, and therefore, include multiple address spaces). Included in the category of implicit transactions are operations that rely on load/store operations to move data between main memory and a storage or network device. As described herein, data transfer and control operations based on implicit transactions will be referred to as "I/O pass through" operations, meaning that they are based on load/store memory accesses (or the like) and, usually contemplate only a single memory address space. In some instances, where there are multiple hosts accessing a common I/O device, there may be an address space for each host. I/O pass through operations are intended to support the attachment of legacy PCI devices to the NG I/O architecture.

According to an embodiment of the present invention, introduction of the NG I/O fabric 328, the NG I/O to host bridge 314 and the NG I/O/PCI bridge 320 (rather than using the standard I/O bridge and bus connection of FIG. 1) between the CPU/memory complex 312 and PCI storage controller 324 allows the I/O systems 318 to be physically removed from the server node box (computer 310) and remotely located, leading to greater connectivity and thus higher overall system throughput. This is the environment for which I/O pass through operations over an NG I/O fabric are intended.

Common to I/O pass through operations are one or more characteristics, including the notion of a single shared address space domain (in some instances), I/O operations based on load and store transactions, and one or more host sever nodes (host computers 310, 360, etc.). Essentially, operations based on implicit transactions allow a physical extension of the standard load and store based I/O subsystem. Physically extending the I/O subsystem provides greater flexibility in initial system design and future upgrades by separating the processor and memory modules from the I/O subsystem. Although physically separate, the I/O platform appears logically integrated.

The single physical address space includes expansion regions for the host and exported I/O platform address maps, including the traditional memory and I/O spaces. A mechanism is also provided to access PCI-compatible configuration space on each device installed in the I/O platform.

To support the attachment of legacy PCI devices to the NG I/O fabric, I/O platform hardware design may include a bridge from the NG I/O fabric to one or more PCI buses (or to other peripheral buses). This configuration allows commercial off-the-shelf PCI-compliant adapters (such as PCI storage controller 324A, FIG. 3) to be installed as bus agents in the I/O platform, providing an effective system-migration path. Maintaining software compatibility with standard PC architectures ensures a logically functional design, although the additional latency incurred by the bridge must be considered to guarantee a successful system implementation.

Protocol

According to an embodiment of the present invention, "protocol" refers to the logical and physical layers of the NG I/O fabric. The data link or logical layer frames packets and sequences physical-layer data flow. The physical layer is the interface between the network medium and network devices. The physical layer defines the NG I/O fabric electrical and mechanical characteristics.

The NG I/O fabric is a standard interface designed to connect server nodes into a cluster and to connect various I/O devices such as storage devices, bridges, and network interfaces. The protocol is intended to operate in an environment assumed to have errors, although not an error prone environment. The protocol provides a means to recover from certain detectable errors.

The protocol comprehends both data and flow control packets. Transactions are split across links, not end-to-end. This effectively posts all operations and dramatically improves network performance. Flow control is credit based. The protocol supports sequencing of packets, which is required to transfer data streams larger than an NG I/O packet size.

The NG I/O protocol is flexible, in that it supports applications based on implicit transactions as well as those based on explicit transactions, as those terms are described above.

The NG I/O protocol provides compatibility features to support PCI devices as well as providing rapid, direct access to host memory. Read and Write operations based on physical addresses (implicit transactions) are supported in three operation domains: memory, I/O, and configuration. In addition, special classes of operation in support of lock and interrupt transport are provided. The list of transaction types supported by the NG I/O protocol includes Memory operations (both explicit and implicit data and control transactions), implicit I/O operations, implicit Configuration operations, Interrupt operations, Locked operations, and Exceptions.

Figure 4:
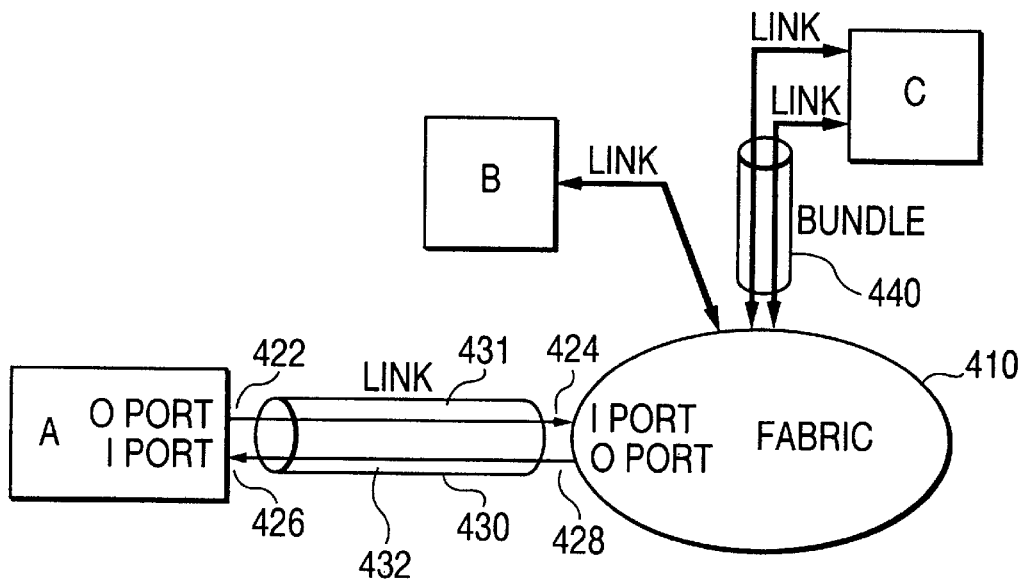
FIG. 4 is a block diagram illustrating NG I/O links according to an embodiment of the present invention.

FIG. 4 is a block diagram illustrating NG I/O links according to an embodiment of the present invention. NG I/O is the protocol, hardware, and software that facilitate communication between network attached devices as illustrated in FIG. 4. A fabric 410 is a set of modules or components connected such that two or more participants can exchange control and data. A link 430 is a bidirectional communication path between two NG I/O connect points in a fabric. An NG I/O fabric is then constructed out of two or more point-to-point links. Multiple links can connect between the same two points, an implementation called bundling (e.g., bundle 440). An NG I/O link 430 includes two unidirectional paths. A unidirectional path 431 of an NG I/O link is connected between an output port 422 of participant "A" and input port 424 of fabric 410; and a unidirectional path 432 is connected between the input port 426 of participant "A" and output port of fabric 410, thereby providing a bi-directional link.

The NG I/O protocol can be used to build a reliable network. NG I/O packets are not be dropped, repeated, corrupted, or re-ordered due to network congestion or transient bit errors. Packets are sent from source to destination, which may be far apart. NG I/O converts one long trip into a series of short trips.

Figure 5:
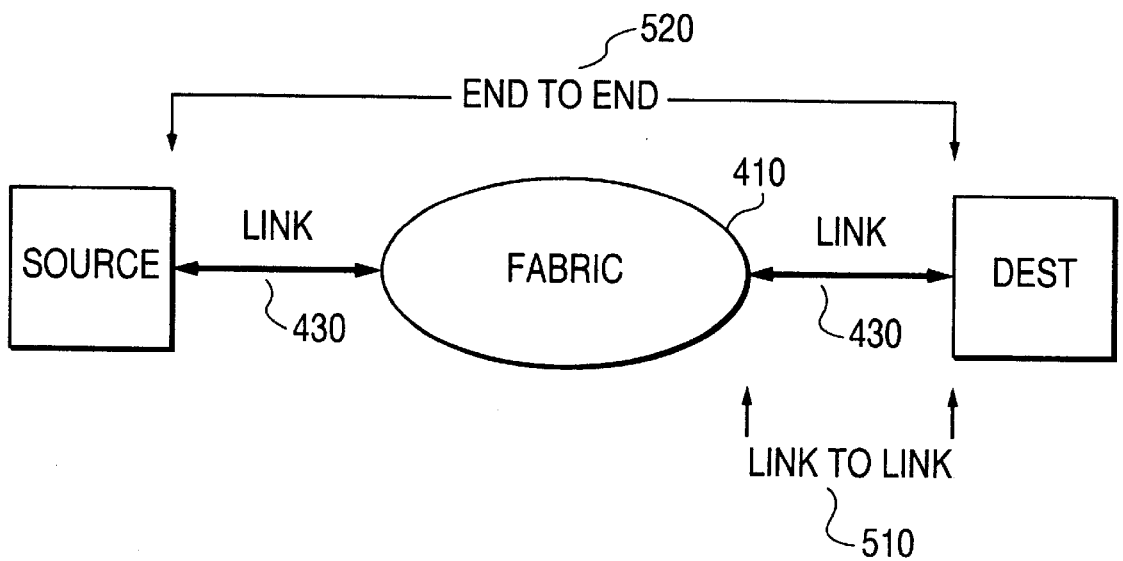
FIG. 5 is a block diagram illustrating application of the NG I/O protocol according to an embodiment of the present invention.

FIG. 5 is a block diagram illustrating application of the NG I/O protocol according to an embodiment of the present invention. Referring to FIG. 5, the NG I/O protocol operates link-to-link 510, not end-to-end 520.

According to an embodiment of the present invention, NG I/O can employ a cut-through routing technique. Like traditional "store and forward" link protocols, packets are buffered as they pass through a link interface. Cut-through minimizes the buffer size required to sustain bandwidth. Unlike traditional protocols, the cut-through link does not have to wait to capture the entire message before forwarding it on to the next link. No additional latency penalty is incurred between link-to-link transfers. Each link sends the packet onto the next link while it checks and acknowledges the packet from the previous link. Each link retains its transmitted packets until acknowledged. Flow control is credit based. Each link retries or de-allocates locally and quickly.

Network Model Stack

To minimize design complexity, modem networks tend to use a layered architecture in which each layer in the hierarchy is a logical entity that performs certain functions. Each layer provides services for the next layer above it and shields the details of how these services are carried out from this higher layer. This hierarchical structure, or stack, performs all tasks and functions required to provide services over the network.

Figure 6:
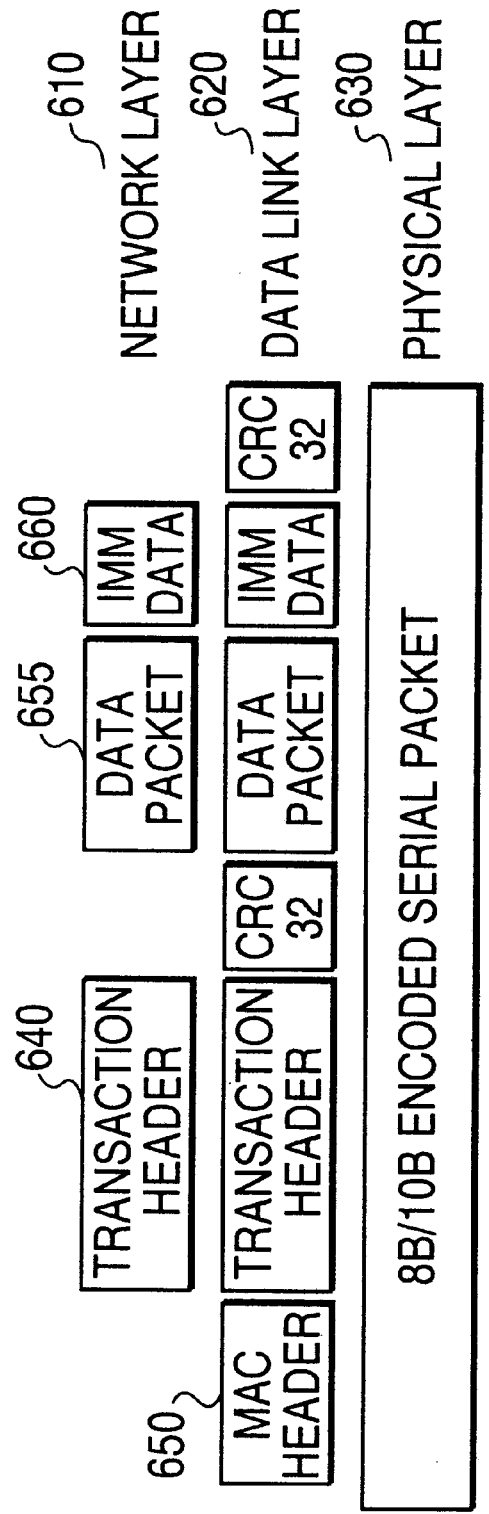
FIG. 6 is a diagram illustrating the NG I/O layers according to an embodiment of the present invention.

FIG. 6 is a diagram illustrating the NG I/O layers according to an embodiment of the present invention. NG I/O implements a network layer 610, a data link layer 620 and a physical layer 630 as illustrated in FIG. 13.

The network layer 610 completes the definition of the interaction between host and network. It accepts a transaction from a transport layer access service point. It then adds a correctly formatted transaction header, identifying the operation type and destination, to each data packet handed it by the transport layer. The network layer 610 also provides the address that is used to steer the transaction through the fabric and passes the transaction to the NG I/O data link layer.

The data link layer 620 accepts a transaction from the network layer access service point and creates a media access control header (MAC). The data link layer 620 creates the CRC-32 checksums that accompany packets. The data link layer provides the final framing and encoding of packets for the physical media. The data link layer controls link layer data flow. Its responsibilities also cover synchronization, reset, and initialization. The data link layer 620 implements the mechanisms that allow bundling, redundancy, and auto discovery. The data link layer 620 also manages link-to-link acknowledges, detects transmission errors and retransmits packets when necessary.

The physical layer 630 accepts a transaction from the data link layer access service point, buffers that transaction to match the physical interface components, and passes the transaction to the NG I/O fabric for transmission.

Transactions

As shown in FIG. 3, I/O devices 318 are located remote from the host computer 310 and emulate the operation of a local PCI bus. This is called I/O pass through mode because the transactions are, in effect, passed through the network (e.g., NG I/O fabric 328) to be replayed at the destination point. In particular, according to an embodiment of the present invention, a transaction is wrapped in a packet, transmitted to the destination point, and then a local transaction (e.g., either a host transaction or a PCI transaction) is generated based on the received transaction data. Specifically, these transactions are intended to provide support of legacy PCI devices.

Implicit Transactions

It is the intention that transactions pass seamlessly through the NG I/O protocol. Physical address loads and stores are supported in three operation domains: memory, I/O, and configuration. In addition, special classes of operation in support of lock and interrupt transport are provided.

For load/store operations, the network layer 610 uses the destination physical address associated with each transaction to deliver a packet to the destination. The network software layer must configure the hardware to match address ranges with associated network addresses. A thin layer of hardware reads the opcode stating the transaction and destination address to direct the transaction to the destination. There is no requirement for fragmentation or reassembly of data.

Error Handling

Cabled networks over distance are considered a noisy/error-introducing, but not necessarily an error-prone environment. Any protocol that chooses this type of media for its messages must enable the receiver to determine whether the message has been corrupted. NG I/O 256-byte data transmit packets are protected by 8B/10B-encoded redundancy and two CRC-32 checksums. There is a checksum for both the header and the data. Performance can be improved when the header has its own checksum—the header can be decoded and checked early, before the arrival of data. It there are no side effects, initiation of the message at the receiver becomes pipelined with the data reception.

Receiving links keep track of the last successfully completed packet sequence. Each received packet is decoded and the CRC is checked. An identified transmission error generates a retry to the previous link. The retry is a negative acknowledge (NAK) of the first bad packet. This implies all previous packets were good and all subsequent packets must also be retried. The flow control is included in the MAC header and can be appended to a packet in transit or sent as its own packet, After receiving the NAK, the transmitting link restarts at the specified sequence and de-allocates previous packets. This mechanism repairs transient faults. A retry counter is available. An unsuccessful re-transmit sequence, as configured by the fabric manager, generates an exception/interrupt packet sent upstream (back to the source). In the event that the source is not available, the packet will be directed to the fabric manager. The transport layer is notified. A non-recoverable error is generated.

Each link has configurable retry and timeout counters. When a link develops a permanent fault, failing on several retries (the amount is configurable) or failing to respond (the interval is configurable), the device shuts down the link, preventing it from carrying any further traffic. The undeliverable packet is sent back to the source with an appropriate error condition appended to the fabric control field of the MAC. When the transport layer is appraised of the problem it sends one last packet, flushing the failing path. The transport layer will then change its routing table to remove this failed path. When the flush packet returns, the transport layer knows all packets from the queue have been recovered in order.

According to an embodiment of the present invention, the transport layer may be able to map an alternative route for returned packets to their proper destination. The transport layer may employ a fabric-aware device to test the failing link status and choose to restore and re-initialize partial restricted functionality to the failed link. A transport layer could use a fabric-aware device to continually poll the failing link, re-enabling the pathway when link integrity is restored.

Protocol Characteristics

NG I/O protocol uses link-based flow control. This means each link transmitter must retain packets until such time as they are acknowledged by the link receiver. Depending on the type of acknowledgment, the transmitter will then either retry or de-allocate the packets.

NG I/O flow control is credit based. At power up, each end of a link determines buffer size, deferring to the smaller implemented buffer if size is different. A transmitter will not send a packet unless buffer space at the receiver is available. Transmitter and receiver also synchronize on width of the link ID counter.

Each link transmitter assigns an ordered ID (beginning with zero) to each sent packet. The link receiver tests the checksum of each delivered packet. If the packet tests with no error, the receiver sends a positive acknowledge (ACK) back to the transmitter. Flow control is either contained in its own packet or is appended (piggy-backed) to a packet assembled for transmission back.

Some period of time can be consumed while the receiver attempts to acknowledge the transmitter. In the interests of efficiency, a receiver can ACK out-of-order to de-allocate buffer space for the named transaction and any other sequentially previous transactions outstanding at the transmitter. In exchange for this performance benefits, the receiver assumes responsibility for tracking transmit ID sequence. This audition activity reduces the opportunity for undetected packets.

In the case of negative acknowledge (NAK), the transmitter may still de-allocate for sequentially previous transactions. NAK instructs the transmitter to resend the indicated packet and any packets that have been sent since then. Each transmitter has a configurable interval timer for the link acknowledge cycle. Each transmitter has a configurable iteration counter for NAK. Rather than congest the link, a transmitter that has run through either counter is obliged to return the undeliverable packet to its source.

Link Bundling

In some NG I/O network configurations, bandwidth demands may exceed the capabilities of a single link. According to an embodiment of the present invention, NG I/O protocol provides a method to remove the single-link bottleneck. Multiple links can connect between the same two points in the fabric. This is called bundling. Bundling is accomplished by striping packets byte-wise over the available, multiple redundant links. This improves speed matching and reduces latency between these high-performance end points. NG I/O hardware does not distribute bandwidth (load balance) or route whole packets on an available-link basis. Load balancing, if it occurs, is the responsibility of higher network stack layers.

Any number of links can be gathered together as a bundle. The order in which the bytes are striped across bundled links maintains a configured ordering and ID. All transactions across striped, bundled lines are always initiated on logical link 0. Packets that are not a multiple of the link bundle are expected to add a null character for alignment purposes on remainder links.

Bundling is not effective for individual packets with no congestion unless the size of the bundle is consistent from source to destination through the fabric. If the size of the bundle is not consistent through the fabric, bandwidth is constrained to that of the weakest link. If the size of the bundle is not consistent through the fabric, transitional devices must store and forward rather than cut-through, adding latency.

Depending on system connectivity options, an NG I/O fabric manager may choose to configure bundled links. Bundling is an optimized, advanced configuration. All NG I/O links initialize to single operation with only logical link 0 functioning, even if multiple redundant links exist. A bundle is treated as a single, high-bandwidth link. If any link of a bundle fails, the high-bandwidth link is failed. Recovery of a failed link is possible, but strongly dependent on implementation choices.

Link Buffering

NG I/O links support link-to-link flow control on packets. Each packet is forwarded, decoded, tested for validity, and stored by each link (in the order).

Although a copy of each packet is buffered, the original packet is passed through an NG I/O interface as quickly as possible. The end result is link behavior usually described as "cut-through" routing strategy. This minimizes latency as the packet moves through the fabric. Each acknowledge or negative acknowledge returned to the transmitter de-allocates or retries the buffered packet. To sustain maximum NG I/O bandwidth, each link must possesses enough buffering to cover the link-to-link transmit-acknowledge cycle.

Transaction Ordering

Packets are ordered strongly while sharing the physical queue structures within each interface. The NG I/O protocol guarantees multiple packets in a given sequence from one source will arrive in order to one destination. However, even within these queues, each transaction is treated as originating from independent streams. NG I/O does not guarantee sequential transaction ordering from one source to many destinations. If separate destinations on NG I/O are expected to act in concert, initiated by NG I/O transactions, through a sideband communication channel, each transaction must be followed by another with end-to-end acknowledge behavior (like a read) to guarantee proper serialization of the command sequence.

Flow Control

NG I/O protocol uses link-based flow control. This means each link transmitter must retain packets until such time as they are acknowledged by the link receiver. Depending on the type of acknowledge, the transmitter will then either retry or de-allocate the packets.

NG I/O flow control is credit based. At power up, each end of a link determines buffer size, deferring to the smaller implemented buffer if size is different. A transmitter will not send a packet unless buffer space at the receiver is available. Transmitter and receiver also synchronize on width of the link ID counter.

Each link transmitter assigns an ordered ID (beginning with zero) to each sent packet. The link receiver tests the checksum of each delivered packet. If the packet tests with no error, the receiver sends a positive acknowledge (ACK) back to the transmitter. Flow control is either contained in its own packet or is appended to a packet assembling for transmission back.

Some period of time can be consumed while the receiver attempts to acknowledge the transmitter. In the interests of efficiency, a receiver can ACK out-of-order to de-allocate buffer space for the named transaction and any other sequentially previous transactions outstanding at the transmitter. In exchange for this performance benefits, the receiver assumes responsibility for tracking transmit ID sequence. This audition activity reduces the opportunity for undetected packets.

In the case of negative acknowledge (NAK), the transmitter may still de-allocate for sequentially previous transactions. NAK instructs the transmitter to resend the indicated packet and any packets that have been sent since then. Each transmitter has a configurable interval timer for the link acknowledge cycle. Each transmitter has a configurable iteration counter for NAK. Rather than congest the link, a transmitter that has run through either counter is obliged to return the undeliverable packet to its source.

Packet Format

Referring to FIG. 6, an NG I/O packet has two headers, one prepared by the network layer 610 called the transaction header 640 and one prepared by the data link layer 620 called the media access control (MAC) header 650. The transaction header 640 is assembled once at the source and disassembled once only at the destination. The media access control (MAC) header 650 holds fabric-specific information. It is assembled, recoded, and disassembled at each link. These two headers are protected with a 32-bit CRC, which is recalculated and appended by the data link layer at each instance.

The NG I/O network layer 610 segments a data stream into packets of 256 or fewer bytes. Segmented streams are reassembled by the destination network layer 610. There is also an option to include an immediate data field 660 after the data packet 655. These two data fields are also protected with a 32-bit CRC. The data and immediate data packets and their associated CRC-32 are created at the source and not altered until reception by the network layer at the destination.

The network layer 610 adds a transaction header 640, identifying the destination, to each data packet handed to it by the transport layer.

This result is this format of the data as it distributes serially down to the data field can be from zero to 256 bytes.

| Transaction Header 11 bytes | Data 0–256 bytes | Immediate Data 4 bytes |
|---|---|---|

The format for the transaction header for implicit (I/O Pass-through) mode is:

| opcode[7:0] | be[15:0] | a[63:2] | lock[1:0] |
|---|---|---|---|

The fields of other transaction header are defined as follows:

| opcode | Defines the transaction type and determines how the rest of the transaction header is to be interpreted. All undefined opcodes are reserved. |
|---|---|
| be | Byte enables for the first 16 bytes of the data packet. Supports a prologue, beginning of a data transfer up to the next boundary, up to 16 bytes. Does not directly support an epilogue, end of a data transfer past the last 16-byte boundary. Epilogue support is inferred from the MAC length field. According to an embodiment of the present invention, n I/O pass-through mode, there is a limitation of one packet per transaction ID (TID). The packet must fit consecutively within sixteen 16-byte partitions. This implies that an unaligned data packet may be further constrained in length than 256 bytes. |
| a | Address - 64-bit addressing is supported. |
| lock | Identifies a special I/O pass through transaction. |

| Lock | Definition |
|---|---|
| 00 | no lock |
| 01 | lock request |
| 10 | from source, lock in progress; |
| 11 | from destination, lock grant. unlock |

According to an embodiment of the present invention, the opcodes and corresponding transactions are assigned as follows:

| Opcode | Transaction |
|---|---|
| 00000000 | Memory Read |
| 00000001 | Memory Write |
| 00000010 | I/O Read |
| 00000011 | I/O Write |
| 00000110 | Read Response |
| 00000111 | Write Response |
| 00001000 | Reserved |
| 00001000 | Reserved |
| 00010001 | Configuration Read |
| 00100000 | Configuration Write |
| 00100000 | Flow Control |
| 01xx0000 | Send |
| 01xx1000 | Send Immediate |
| 01xx0010 | RDMA Read Request |
| 01xx1010 | RDMA Read Request |
| 01xx0011 | Immediate |
| 01xx1011 | RDMA Write |
| 01xx0110 | RDMA Write Immediate |
| 01xx1110 | RDMA Read Response |
| Xx1xxxxx | RDMA Read Response |
| Xxx1xxxx | Immediate |
| 1xxxxxxx | First Packet Of A Large DMP Transfer |
| | Last Packet Of A large DMP Transfer |
| | Reserved |

The Media Access Control header is added to each transaction by the data link layer.

The result is this format and order of data as the transaction is passed serially down to the physical layer:

| MAC Header 11 bytes | Transaction 11 bytes | Header CRC 4 bytes | Data 0–256 bytes | Immediate Data 4 bytes | Data CRC 4 bytes |
|---|---|---|---|---|---|

The MAC header 650 is assembled, disassembled, and usually modified at each intermediate link. To save time and bandwidth, local link control can be appended to the MAC header of a transaction in progress.

The format of the MAC header is:

| version [3:0] | pri/type | src/dest | fabcnt [7:0] | length [8:0] | reqid [9:0] | ack/nak# | cmpid [9:0] | reserve[9:0] |
|---|---|---|---|---|---|---|---|---|

The fields of the MAC header are as follows:

| version | Of the NG I/O protocol |
|---|---|

| Version | Definition |
|---|---|
| 00 00 | Initial Implementation |
| 00 01 | Reserved for Future Use |
| .... | Reserved for Future Use |
| 11 11 | Reserved for Future Use |

| priority/type | Of the transaction. This field can be used to identify different priority transactions, virtual channels, or in support of other network protocols over NG I/O. |
|---|---|

| Pri/Type | Definition |
|---|---|
| 00 00 | Priority Zero Packet (Lowest) |
| 00 | Priority One |
| 01 00 | Packet Priority Two |
| 10 00 | Packet Priority Three |
| 11 | Packet (Highest) |
| 01 00 | Reserved/TBD |
| ... | Reserved/TBD |
| 11 11 | Reserved/TBD |

| src/dest | Defines route or endpoints of the transaction through the fabric. Each source and destination is unique for a network total of 65,635 endpoints. This field may have different formats depending on NIC and fabric implementations. |
|---|---|
| fabcntl | Fabric control, identifies special transactions such as management frames for switches within the fabric. Implementation dependent. |
| length | Number of bytes units in data packet, irrespective of byte marks. This number includes the immediate data field, if any. |
| reqid | Request ID number for transactions, also sequence numbers for associated port. |
| ack/nak# | Defines how the cmpid is being acknowledged. |
| cmpid | ID number of the last packet acknowledged on that port. |

Operation of I/O Pass Through transactions

The operation of the I/O pass through transactions will now be briefly described. According to an embodiment of the present invention (see, e.g., FIG. 3), one or more host computers 310, 360 are coupled to a plurality of I/O systems 318. With respect to each computer or host, 310, 360, each I/O system 318 is mapped to a specific predetermined range within the address range of the host computer. According to an embodiment of the present invention, the host memory address ranges for each of the possible I/O systems 318 are in hardware or firmware of host node 210 and are provided to the host CPU 310 at power-up initialization. Alternatively, the memory address ranges are provided to each host computer during initialization in response to one or more broadcast query packets. The host memory address ranges mapped for each I/O system 318 may be different for different host computers 310, 360.

According to an embodiment of the present invention, at power-up initialization of host computer 310, NG I/O/host bridge 324 broadcasts a query packet to all I/O systems 318 connected to NG I/O fabric 328. Each I/O system responds to the query packet with a reply packet that includes a memory map for that I/O system (e.g., PCI configuration space information for the NG I/O/PCI bridge 320A and all PCI devices 326 connected thereto). Each reply packet will include the network address of the I/O system 318 in the source field. Based on the PCI configuration space information and the network address for each I/O system 318 (e.g., network address for the NG I/O/PCI bridge 320A), the NG I/O/host bridge 324 generates and stores in memory a system memory map that identifies, for each I/O system 318 connected to the NG I/O fabric 328, the network address of the I/O system and the corresponding mapped host memory address range (for that I/O system). The system memory map can be stored, for example, in a dedicated memory, or in system main memory.

In addition, during system initialization, each I/O system 318 (i.e., each NG I/O/PCI bridge 320) generates a local I/O memory map that identifies a PCI address range corresponding to a host memory address range and the network address of the host computer. If there is only one host computer 310 connected via NG I/O fabric 328 to the I/O system 318, then the host memory address can map directly (one-to-one) to the PCI address. This means that when there is only one host computer 310, each host memory address range can be the same as the host memory address (but these are not necessarily the same). When there is more than one host computer (computers 310, 360, etc.) coupled to an I/O system 318, the host memory address can map to a different PCI address for each host computer. (Alternatively, the NG I/O/host bridge 314 could also store the local I/O memory map for each I/O system 318).

Figure 7:
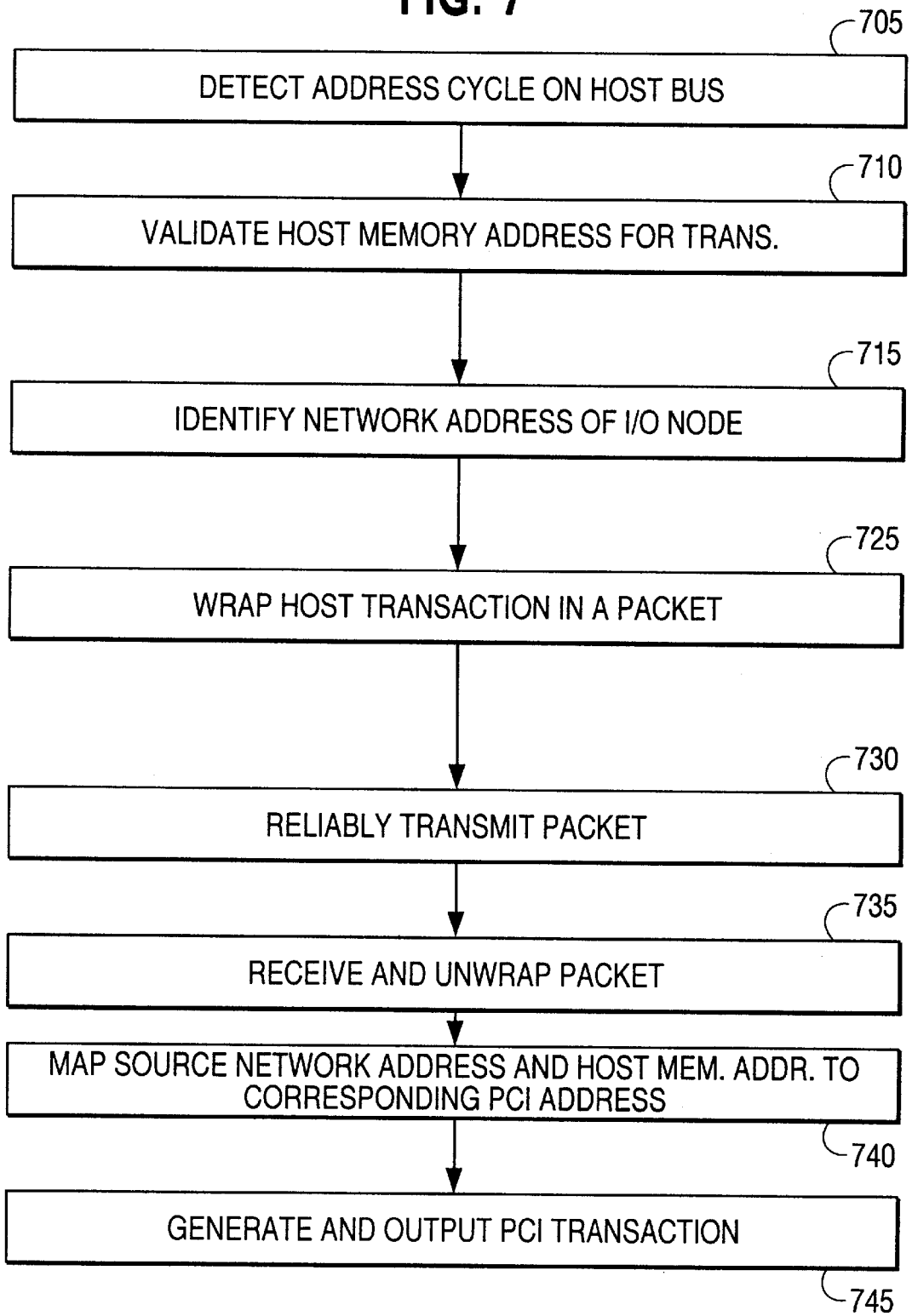
FIG. 7 illustrates a flow chart describing the flow for a host computer to I/O system transaction according to an embodiment of the present invention.

FIG. 7 illustrates a flow chart describing the flow for a host computer 310 to I/O system 318 transaction (e.g., outbound transaction) according to an embodiment of the present invention. According to an embodiment of the present invention, the operation described by FIGS. 7 and 8 (also described below) both assume that a system memory map and one or more local I/O memory maps have been generated during power-up initialization (or at some other time). Each host computer 310 (or each NG I/O/host bridge 314) is assigned a predetermined address range.

Referring to FIG. 7, at step 705, the NG I/O/host bridge 314 (FIG. 3) detects an address cycle (generated by the host CPU 312) on the system bus and determines if the address is directed to the address range of NG I/O/host bridge 314.

At step 710, the NG I/O host bridge 314 validates the host memory address (accepts the transaction) because the transaction address is directed to the address range assigned to the NG I/O/host bridge 314. Otherwise, the transaction is directed to another memory address or location (e.g., address is directed to another bridge or to main memory 316) and is ignored by NG I/O/host bridge 314.

At step 715, the NG I/O/host bridge 314 identifies the network address of the I/O system corresponding to the host memory address (of the validated host transaction) using the system memory map. As described above, the system memory map maps a host memory address range to a network address of the corresponding I/O node.

At step 720, the NG I/O/host bridge 314 wraps the host transaction in an NG I/O packet. This step includes generating a packet payload and headers of the NG I/O packet. The NG I/O packet includes the MAC header 650, transaction header 640 and the data packet 655, FIG. 6. The MAC header 650 includes the source network address (network address of the computer system 310) and the destination address (the network address of the I/O system 318 obtained from the system memory map). The transaction header 640 includes an opcode identifying the transaction type (read, write, etc.), lock field indicating whether lock is requested, etc., and the host memory address for the transaction. If the transaction is a write, then data is provided in the data field 655 of the NG I/O packet. (Alternatively, the host computer 310 can convert the host memory address to a corresponding PCI address for the I/O system, and then load this PCI address into the NG I/O packet. This alternative embodiment simplifies processing at the I/O system because the address is already converted to a PCI format.)

At step 730, the network packet (NG I/O packet) is reliably transmitted over the NG I/O fabric 328 to the I/O system 318 designated by the destination network address.

At step 735, the NG I/O packet is received and unwrapped at the I/O system 318. The transaction header 640, data field 655 and the network address of the source host computer 310 (provided in the MAC header) are stripped out of the NG I/O packet for examination.

At step 740, the NG I/O/PCI bridge 320 maps the source network address (identifying the network address of the host computer 310) and the host memory address (provided in the transaction header 640) for the transaction to an appropriate PCI address (local PCI address) based on previously generated local I/O memory map.

At step 745, the NG I/O/PCI bridge 320A generates and outputs one or more PCI transactions onto the PCI bus 322A based on the transaction type (e.g., a read or write transaction specified in the transaction header), lock field and the data provided in the NG I/O packet (if a write transaction), and the corresponding PCI address (address phase followed by data phase in accordance with PCI). In this manner, the NG I/O/PCI bridge 320A emulates the PCI interface of a standard host to PCI bridge, but includes the additional steps of first unwrapping the transaction and converting the host memory address to a corresponding PCI address. If a write transaction is received, an acknowledgment packet is generated by bridge 320 and transmitted back to the computer 310 after the write operation is completed.

In the event of a read transaction (e.g., a host read to a PCI device), the requested data is obtained by the NG I/O/PCI bridge 320A. The requested data may be buffered from a plurality of PCI transactions if necessary. The requested data, the corresponding host memory address and the network address of the host computer requesting the data are wrapped in an NG I/O packet for transmission to the computer 310 via NG I/O fabric 328.

Figure 8:
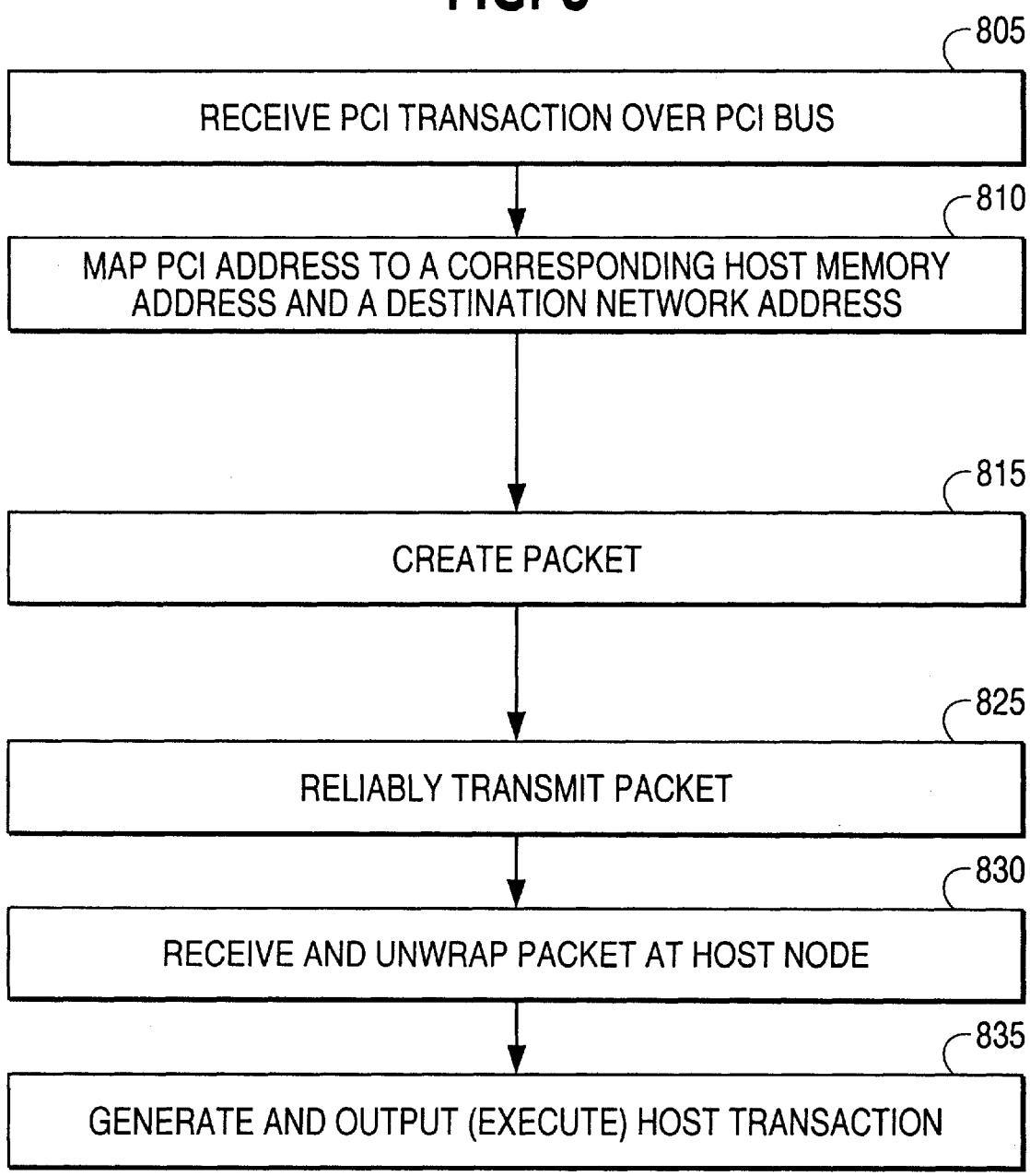
FIG. 8 illustrates a flow chart describing the flow for an I/O system to host computer transaction according to an embodiment of the present invention.

FIG. 8 illustrates a flow chart describing the flow for an I/O system to host computer transaction according to an embodiment of the present invention.

At step 805, the NG I/O/PCI bridge 320 receives a PCI transaction (PCI address and data, etc.) from a PCI device 326 over PCI bus 322. The NG I/O/PCI bridge 320 examines the PCI address and accepts the PCI transaction if the PCI address is within the range assigned to the NG I/O/PCI bridge 320.

At step 810, based on the PCI address, the NG I/O/PCI bridge 320 maps the PCI address of the transaction to a specific network address (identifying the target host computer 310) and the corresponding host memory address using a local I/O memory map.

At step 815, the NG I/O/PCI bridge 320 creates an NG I/O packet based on the PCI transactions (e.g., wraps the PCI transactions in an NG I/O packet). The NG I/O packet includes data (if a write operation), the network address of the source (I/O system 318), the network destination address (the network address of the destination computer 310 obtained from the local I/O memory map), and the host memory address obtained from the local I/O memory map (corresponding to the PCI address or address range of the PCI transaction).

At step 825, the NG I/O packet is transmitted to the target host computer 310 via the fabric 328.

At step 830, the network packet (NG I/O packet) is reliably received by the host computer 310. The packet is unwrapped to obtain the source network address, the data and the transaction header. If the transaction is a write, an ACK packet is sent back to the I/O system 318 (or an ACK may be sent after completion of the write).

At step 835, a host memory transaction is generated and executed at the host computer (e.g., output onto the host bus from the NG I/O/host bridge 314) based on the fields provided in the NG I/O packet. If the transaction is a read, the requested data is obtained from memory, wrapped in a (reply) NG I/O packet, and sent to the requesting I/O system 318 via fabric 328.

Lock Mechanism

In current systems, as illustrated in FIG. 1, Peripheral Component Interconnect (PCI) allows an initiator of a PCI transaction (host/PCI bridge 112) to obtain exclusive access to a target memory device (or a portion of memory) during two or more separate PCI transactions by asserting a PCI Lock# signal on PCI bus 113. For example, referring to FIG. 1, the CPU 110 generates a locked read host memory transaction addressed to an I/O device 326. The host/PCI bridge 112 (operating as a PCI master or initiator) receives the locked read host transaction and obtains ownership of the PCI bus 113. The host/PCI bridge 112 generates and outputs the appropriate PCI transaction (including address and data phases) onto PCI bus 113 and asserts the Lock# signal. The read transaction is received and claimed by the storage controller 324 (operating as a PCI target), based on the address of the transaction. The storage controller 324 forwards the read request to the properly addressed I/O device 326. In addition, in response to the asserted Lock# signal, the storage controller 324 locks the I/O device 326 (or a portion of memory of the device), thereby preventing access by other bus masters during the Lock period. Storage controller 114 maintains the lock on the I/O device until the bus master (host/PCI bridge 112) releases the Lock# signal. If another master attempts to access I/O device 326 (or the locked portion thereof) during the Lock period, the PCI target (storage controller 324) issues a retry to the master indicating that the bus master should retry the transaction later.

In addition, in present computer systems, because multiple processors can share a single host/PCI bridge 112 (e.g., as a PCI bus master or PCI initiator), a read request to a locked resource on PCI bus 113 from a different CPU (e.g., CPU 105 vs. CPU 110) appears to storage controller 324 to be just another read request from the bus master that locked the resource (host/PCI bridge 112). Therefore, after a resource has been locked in response to a first CPU, the host/PCI bridge 112 can receive a host transaction from a second CPU and determines that it is a read transaction from a different CPU and addressed to the locked device. To prevent such a problem, the host/PCI bridge 112 performs a security function in a multiprocessor system by issuing a retry to the second CPU (while the resource is locked), rather than forwarding the PCI transaction.

The lock feature according to an embodiment of the present invention will now be described. Resource locks are included in an embodiment of the distributed computer system of the present invention to support legacy (e.g., PCI) hardware and device drivers.

According to an embodiment of the present invention, locked transactions can only be initiated from a host computer, not from a peripheral device (e.g., I/O systems 318). A lock is initiated as a read request with the Lock field in the transaction header to set to lock request. This requests the NG I/O destination interface to protect the memory resources named by the read transaction from other lock requests. The lock initiator is constrained to only one lock transaction outstanding to each destination. Lock uniqueness is then established by the transaction address and MAC source/destination fields.

Figure 9:
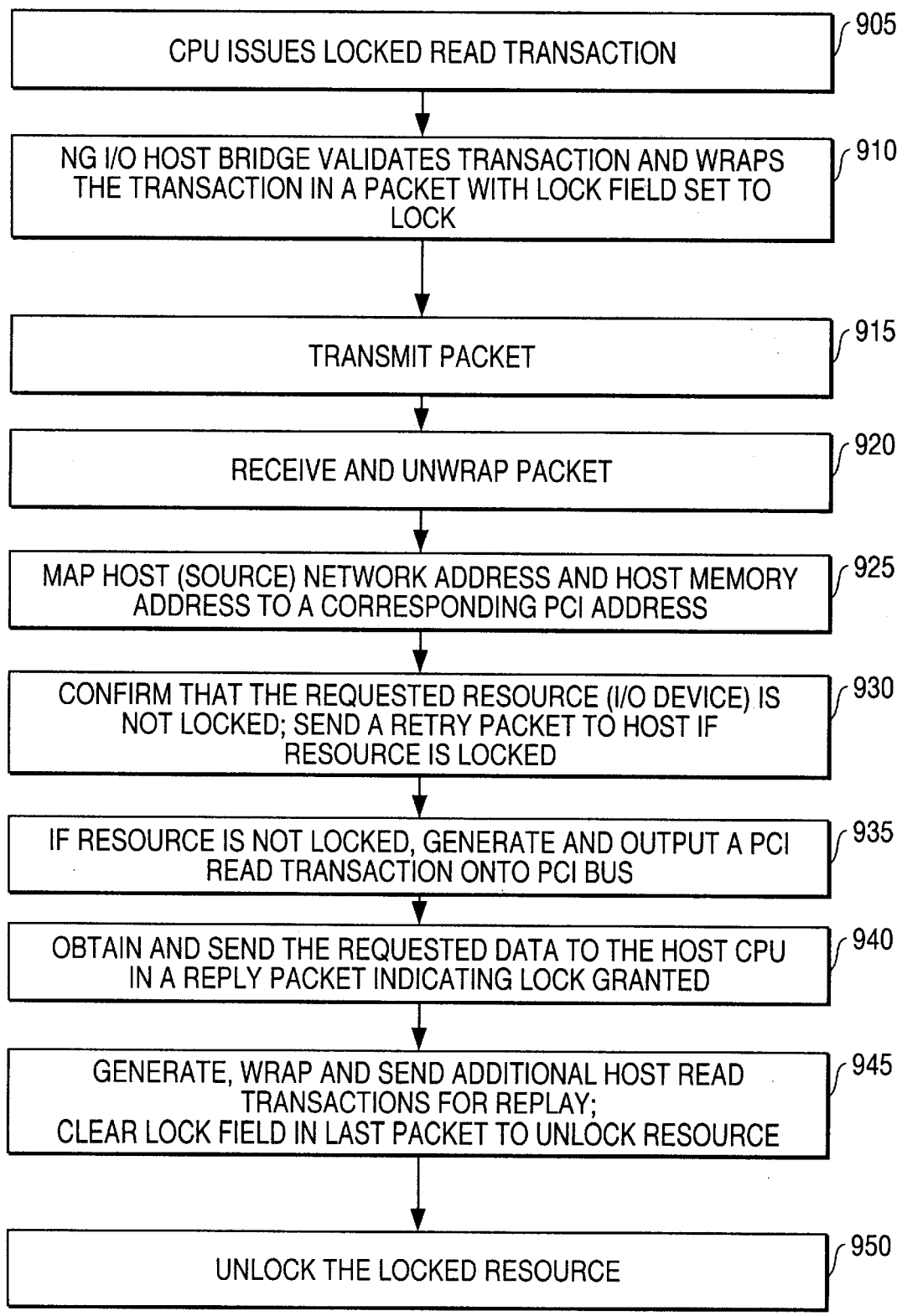
FIG. 9 is a flow chart illustrating the processing of a locked transaction according to an embodiment of the present invention.

FIG. 9 is a flow chart illustrating the processing of a locked transaction according to an embodiment of the present invention. Referring to FIGS. 3 and 9, at step 905, the CPU of computer 310 issues a locked read transaction.

At step 910 the NG I/O/host bridge 314 validates the locked read transaction based on the host memory address, identifies the network address of the (target) I/O system corresponding to the host memory address using the system memory map, and then wraps the transaction (i.e., information describing the transaction) in a NG I/O packet with the Lock field set to Lock (because a locked transaction is requested).

At step 915, the NG I/O packet is transmitted over the fabric 328 to the target or destination I/O system.

At step 920, the NG I/O packet is received and unwrapped at the NG I/O/PCI bridge 320.

A step 925, the source network address and host memory address is mapped to a corresponding PCI address using a local I/O memory map.

At step 930, the NG I/O/PCI bridge 320 confirms that this read transaction is not directed to a locked device or resource (or a locked portion thereof). If a device or resource was previously locked, the NG I/O/PCI bridge 320 stores the PCI address of the requested resource and the source network address of the computer (bus master) that requested the lock to allow bridge 320 to reject further attempts to access the locked resource. When the current read transaction is received at bridge 320, the bridge 320 compares the PCI address of the current transaction to PCI addresses of any locked resources to determine if the resource is locked (indicated by a match). If a match is found (indicating an attempt to access a locked resource), the transaction is rejected if the transaction is not from the same network address which requested the lock. In such case where there is an attempt to access a locked resource by an unauthorized computer, the NG I/O/PCI bridge 320 generates and sends a retry packet back to the requesting computer informing the requesting computer to retry the transaction (because the resource is presently locked by another master or computer). In this manner, NG I/O/PCI bridge 320 performs a security function by protecting any locked resource from unauthorized access.

At step 935, if the requested resource is not locked (or if access is requested by the same computer that requested the lock), a corresponding PCI read transaction is generated and output by bridge 320 onto PCI bus 322, asserting the Lock# signal to indicate it is a locked transaction.

At step 940, the requested data is obtained, wrapped in a reply packet and sent to the requesting host computer 310, with the Lock field set to Lock Grant (indicating that the Lock was granted).

At step 945, additional locked read transactions are generated by the host computer 310, wrapped in a packet, and sent to the I/O system 318 for replay as a corresponding PCI transaction. The Lock field is set to Lock In Progress for these additional locked transaction packets. The NG I/O/PCI bridge 320 similarly confirms that access to this locked resource is proper (e.g., by detecting that the additional transaction packets are from the same network address that requested the lock, and therefore, access is permissible). The Lock field is set to Unlock for the last locked read packet from the host computer 310.

At step 950, in response to the last NG I/O packet from the host computer 310 (in which the Lock field is set to Unlock), the NG I/O/PCI bridge 320 unlocks the resource (e.g., allows all bus masters top access the resource).

Interrupts From Remote I/O Devices

In current computer systems, such as illustrated in FIG. 1, an I/O device 326 connected to a PCI bus 113 can generate an interrupt to a processor (i.e., a request for service) using one of several PCI interrupt signals, including IntA#, IntB#, IntC# and IntD#. An I/O device may generate an interrupt, for example, if a parity error was detected during a read to the device. If the I/O device is a network interface card, the card will need to interrupt the processor when a packet is received for processing. In such current systems, the PCI interrupt signals are typically coupled to a processor interrupt line, for example, via one or more 8259 Programmable Interrupt Controllers, or through an Advanced Programmable Interrupt Controller (APIC). During system initialization, the processor or CPU performs an I/O bus scan by attempting to read the vendor ID for each physical PCI device position on the PCI bus 113. If a PCI device is detected, memory space is allocated for the device (in the memory map), and the processor reads the device's interrupt pin register to determine if it is interrupt driven. If the device is interrupt driven, the address of the device's interrupt service routine is obtained and used to build the interrupt jump table entry for this device. After receiving an interrupt from an I/O device, the processor typically executes an interrupt acknowledge bus cycle to obtain the interrupt vector for the interrupt. Based on the interrupt vector, the processor then typically obtains the address of the interrupt service routine for the device using the interrupt jump table, and then executes the interrupt service routine to service the interrupt.

Figure 10:
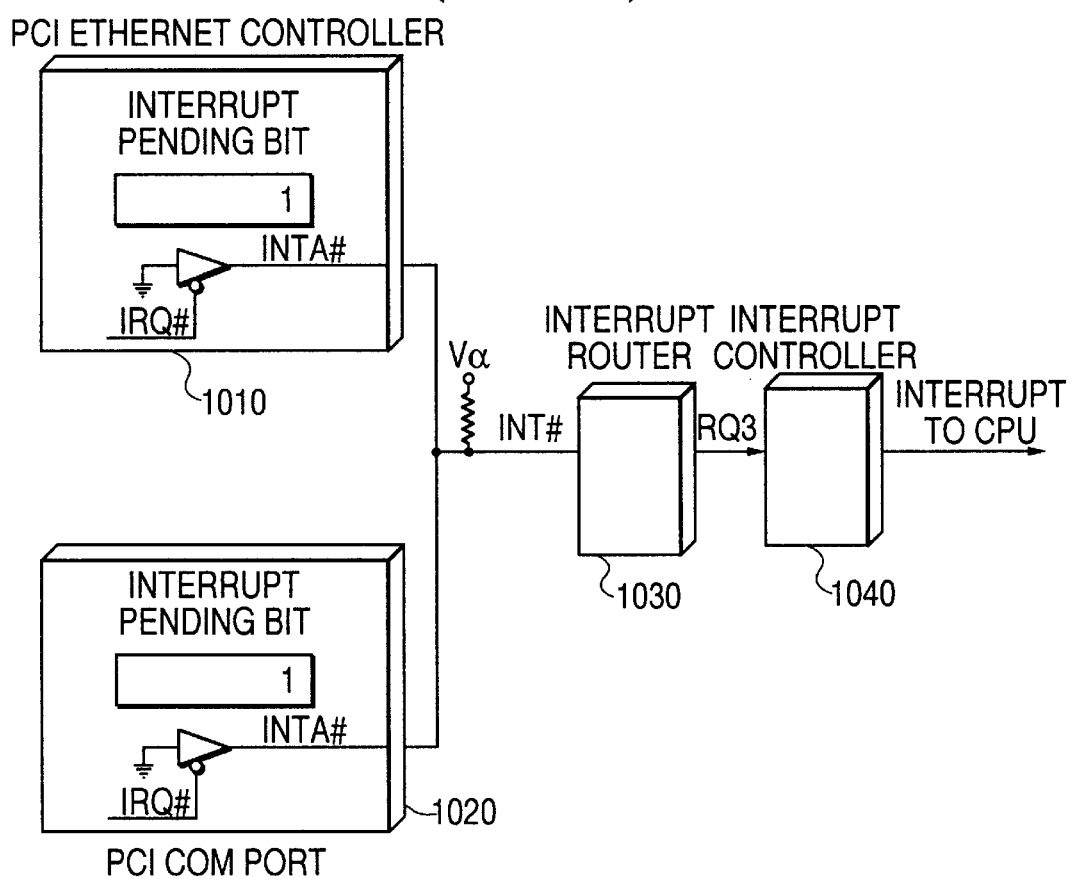
FIG. 10 is a block diagram of an example of an interrupt arrangement of a current computer system.

FIG. 10 is a block diagram of an example of an interrupt arrangement of a current computer system. The system includes two interrupt-driven PCI devices, including a PCI Ethernet controller 1010 and a PCI Comport 1020. Both PCI devices 1010 an 1020 share the same interrupt request signal. An interrupt router 1030 is provided as part of the host/PCI bridge 112 to route and prioritize interrupts to an interrupt controller 1040. The interrupt signal (IntA#) is output by interrupt router 1030 as IRQ3 and output by interrupt controller 1040 to the CPU. Interrupt controller 1040 outputs the interrupt to the CPU. In this example for current computers, the interrupt IRQ3 is associated with the interrupt vector 0BH. There are two interrupt service routines stored in memory associated with this interrupt vector, one service routine for the PCI Ethernet controller 1010 and one service routine for the PCI Com port 1020. When issuing an interrupt, each device 1010 or 1020 sets their respective interrupt pending bit and sets the interrupt request line (IntA#) low. In response to the interrupt, the processor (CPU) then generates interrupt acknowledge bus cycles to request the interrupt vector associated with the highest priority interrupt. The interrupt controller provides the interrupt vector (0BH) associated with the IRQ3 interrupt. The CPU then begins executing the first interrupt service routine associated with interrupt vector OBH to determine the I/O device that generated the interrupt. In this example, the Ethernet Controller 1010 generated the interrupt. If the first service routine in memory is for the PCI Corn Port 1020, the CPU executes the front end of this routine and reads the PCI Corn port's Interrupt Pending Bit (which is clear, indicating that the PCI Corn Port 1020 did not interrupt the CPU). The CPU next jumps to the interrupt service routine for the Ethernet Controller 1010, and reads the interrupt pending bit of the Ethernet Controller 1010. In this example, the interrupt pending bit in Ethernet Controller is set, indicating that the Ethernet controller 1010 generated the interrupt. The CPU then executes this interrupt service routine for the Ethernet Controller.

However, this arrangement and operation of interrupts in current computers does not work in a distributed computer system.

The operation of the remote interrupt of the present invention will now be described. According to an embodiment of the present invention, interrupts are generated by remotely located I/O devices, wrapped in an NG I/O packet, transmitted to the host computer via NG I/O fabric, unwrapped, and replayed at the host computer for processing. According to the present invention, the operation and processing of the remote interrupts is performed so as to appear to the I/O devices, CPU, interrupt controller and device drivers to be a locally generated PCI interrupt, even though the interrupt is generated by an I/O device that is remotely located from the host computer.

Figure 11:
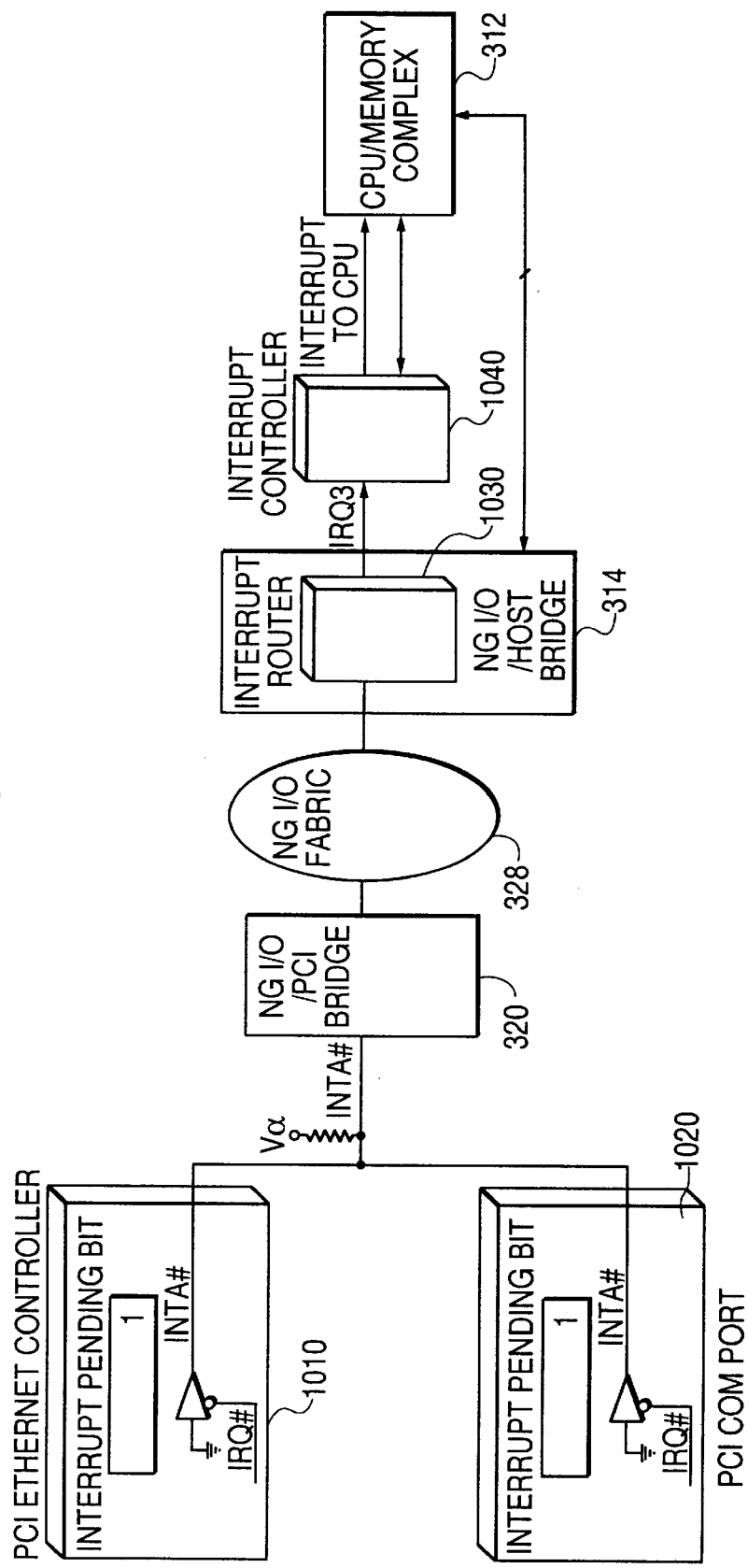
FIG. 11 is a block diagram of a distributed computer system according to an embodiment of the present invention.

FIG. 11 is a block diagram of a distributed computer system according to an embodiment of the present invention. Multiple PCI devices, including Ethernet controller 1010 and PCI Corn Port 1020, are connected via a PCI bus (including the IntA# signal) to NG I/O/PCI bridge 320. Bridge 320 is coupled to NG I/O/host bridge 314 via NG I/O fabric 328. According to this embodiment of the present invention, the NG I/O/host bridge 314 includes the additional functions of an interrupt router 1030. An interrupt controller 1040 and the CPU/memory complex 312 (including CPU and memory of host computer 310) are connected in series to the bridge 314.

According to an embodiment of the present invention, during system initialization, the host CPU performs an I/O bus scan (to identify connected I/O devices). The NG I/O/host bridge 314 detects the I/O bus scan from the CPU (e.g., CPU attempts to read PCI bus addresses) and generates and broadcasts an I/O bus scan query packet to all I/O devices connected to fabric 328 in response to the I/O bus scan. In response to the I/O bus scan query packet, each I/O device generates and transmits a reply packet to computer 310 that includes device specific information, including the network address and PCI address range of the I/O device (e.g., there can be multiple I/O devices 326 associated with a single network address of NG I/O/PCI bridge 324), the vendor ID of the device (identifying the type of device), information indicating whether the I/O device is interrupt driven, and the memory address (e.g., PCI address) of the interrupt service routine for the device (or a copy of the interrupt service routine is provided for storage in main memory of computer 310).

NGI I/O/host bridge 314 then builds a system memory map identifying the network address and PCI address range of each connected I/O device and the corresponding host memory address.

Also during system initialization, the CPU of host computer 310 builds an interrupt jump table that identifies the host memory address of one or more interrupt service routines for each of a plurality of interrupt vectors. There is, for example, one interrupt service routine for each VO device (e.g., devices 1010 and 1020, FIG. 11). Because the I/O devices 1010 and 1020 share the same interrupt line (IntA#, and IRQ3), the interrupt service routines for these two are stored in series in memory beginning at a location indicated by the interrupt jump table entry for the interrupt vector OBH (corresponds to IRQ3). These interrupt service routines can be obtained from several locations, including local ROM, main memory, or from memory of the remotely located I/O device itself, and then stored in local memory at the proper location.

FIG. 12 is a flow chart illustrating the processing of a remote interrupt according to an embodiment of the present invention. Referring to FIGS. 11 and 12, at step 1205, a remote I/O device (e.g., the PCI Ethernet controller 1010) generates an interrupt on the PCI bus by asserting the PCI interrupt signal IntA#, and by setting its interrupt pending bit.

At step 1210, in response to the interrupt signal from the Ethernet controller 1010, the NG I/O/PCI bridge 320A generates an interrupt packet. The interrupt packet includes the network address of the NG I/O/PCI bridge 320 (in the source field), the network address of the target NG I/O/host bridge 314 (in the destination field), and the interrupt field set to Interrupt. This interrupt packet is used to transport the interrupt to a remotely located host computer.

At step 1215, the interrupt packet is transmitted over the fabric 328 to NG I/O/host bridge 314 of host computer 310.

At step 1220, the received interrupt packet is received and unwrapped by the NG I/O/host bridge 314.

At step 1225, the NG I/O/host bridge 314 replays the interrupt by outputting the interrupt as IRQ3 to the interrupt controller 1040, which outputs an interrupt signal to the host CPU.

At step 1230, the host CPU of computer 310 acknowledges the interrupt by generating an interrupt acknowledge bus cycle.

At step 1235, the interrupt controller 1040 of bridge 314 (FIG. 11) outputs the interrupt vector 0BH, for example (corresponding to IRQ3) to the host CPU in response to the bus acknowledge cycle.

At step 1240, the CPU of computer 310 then uses the interrupt jump table to calculate the host memory address of the (first) interrupt service routine associated with the received interrupt vector, 0BH.

At step 1245, the CPU then begins executing the first interrupt service routine to identify the I/O device that generated the interrupt. The CPU issues a read transaction onto the host bus to read the interrupt pending bit of the I/O device indicated by the interrupt service routine.

At step 1250, the NG I/O/host bridge 314 detects that the address of the read transaction is directed to it, and wraps the read transaction in an NG I/O packet, and transmits the packet to bridge 320.

At step 1255, the NG I/O packet for the read transaction is received and unwrapped at the NG I/O/PCI bridge 320, and replayed as a PCI transaction to the I/O device of the first interrupt service routine associated with interrupt vector 0BH.

At step 1260, the requested data (the value of the interrupt pending bit of the I/O device) is wrapped in a packet, transmitted back to the NG I/O/host bridge 314 via fabric 328, and replayed as a host transaction to the CPU. This wrapping and unwrapping of NG I/O packets and transmitting packets over the NG I/O fabric 328 is transparent to the CPU and the I/O devices, except for some additional latency. If the interrupt pending bit of the I/O device is clear (a "0"), then the host CPU executes the front end of the next interrupt service routine (associated with interrupt vector 0BH) to query the next I/O device. These query transactions and reply data are similarly wrapped, transmitted, unwrapped and replayed to allow the CPU to determine which remote I/O device generated the interrupt.

At step 1265, the CPU finally reads an interrupt pending bit of an I/O device (in this case, the Ethernet controller 1010) that is set (a "1"), and then executes the interrupt service routine for that I/O device.

The distributed computer system of the present invention allows host computers to remotely access one or more I/O systems. The remote lock feature of the present invention allows a remote resource to be locked as if the resource were local by setting a Lock field in a transaction header of the packet to Lock. A transaction to a resource that is locked is treated as an undeliverable packet. The source of the granted lock releases the destination memory resource by setting the Lock field to Unlock in the transaction header of the final locked transaction. Similarly, the remote interrupt feature of the present invention permits a remotely located I/O device to interrupt a host CPU (request service). The interrupt is received and an interrupt packet is generated and transmitted over the fabric to the host computer. The interrupt is replayed and the host computer executes an appropriate interrupt service routine.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of executing a locked transaction over a distributed computer system to a remotely located I/O resource, the distributed computer system comprising a host computer and a remotely located I/O resource that is coupled to the host computer via a network, said method comprising the steps of:

detecting a locked host transaction on a host computer that is targeted to a remotely located I/O resource;

wrapping the locked transaction in a packet for transmission over a network, the packet including a field indicating that the transaction is locked;

transmitting the packet over the network to the remote I/O resource;

unwrapping he packet received at the I/O resource;

converting the locked host transaction to a locked I/O transaction;

determining if the targeted resource is already locked by another host; and if the targeted I/O resource is not locked by another host computer, then replaying the locked transaction to the targeted I/O resource.

2. The method of claim 1 and further comprising the step of sending a rejection packet over the network back to the host computer if the targeted I/O resource is locked by another host computer.

3. The method of claim 2 wherein said rejection packet requests that the host retry the transaction to the locked resource.

4. The method of claim 1 wherein the host transaction is a locked host read transaction.

5. The method of claim 1 wherein the host transaction is a locked host write transaction.

6. The method of claim 1 wherein said step of determining if the targeted resource is already locked by another host comprises the step of comparing the network address of the host computer to the network address of any host that previously locked a resource.

7. The method of claim 1 wherein said step of determining if the targeted resource is already locked by another host comprises the step of comparing the network address of the host computer and the memory address of the transaction to the network address of another host that previously locked a resource and a memory address of the previously locked resource, respectively.

8. A method of executing a locked transaction over a distributed computer system to a remotely located I/O resource, the distributed computer system comprising a host computer and a remotely located I/O resource that is coupled to the host computer via a network, said method comprising the steps of:

detecting a locked host transaction on a host computer that is targeted to a remotely located I/O resource;

identifying, based on the memory address of the locked host read transaction, that the host transaction is directed to the I/O resource that is remotely located from the host computer;

wrapping the locked transaction in a packet for transmission over a network, the packet including a field indicating that the transaction is locked;

transmitting the packet over the network to the remote I/O device;

unwrapping the packet received at the I/O device;

converting the locked host transaction to a locked I/O transaction;

confirming that the targeted I/O resource is not already locked by another host computer;

if the targeted I/O resource is not locked by another host computer, then outputting the locked read transaction to the targeted I/O resource;

otherwise, if the targeted I/O resource is locked by another host computer, then sending a rejection packet over the network to the host computer rejecting the locked read request.

9. A distributed computer system comprising:

a host CPU;

a network/host bridge coupled to the host CPU, said network/host bridge adapted to detect a locked host transaction directed to a remotely located target I/O resource and wrap the host transaction in a packet for transmission over a network, said packet including a field indicating that the transaction is locked;

a network/I/O bridge coupled to the network/host bridge via a network, said network/I/O bridge adapted to receive and unwrap the packet and replay the locked transaction over an I/O bus to the targeted I/O resource.

10. A method of processing a remote interrupt in a distributed computer system, the distributed computer system comprising a host computer and a plurality of remotely located I/O devices, each of the I/O devices coupled to the host computer via a network, said method comprising the steps of:

generating an interrupt at one of the remote I/O devices;

wrapping and transporting the interrupt over the network to the host computer;

unwrapping and replaying the interrupt to the host computer;

generating, wrapping and transmitting one or more host read transactions to one or more remote I/O devices in response to the replayed interrupt;

unwrapping and replaying the read transactions to the one or more remote I/O devices;

obtaining information identifying the I/O device that generated the interrupt;

wrapping and transmitting the information identifying the I/O device that generated the interrupt to the host computer;

executing an interrupt service routine associated with the I/O device that generated the interrupt based on the information identifying the I/O device.

11. The method of claim 10 and further comprising the step of generating an interrupt jump table.

12. The method of claim 11 wherein said step of generating an interrupt jump table comprises the steps of:

the host computer issuing one or more I/O bus scan transactions to identify any interrupt driven I/O devices;

generating and transmitting one or more query packets requesting an identification of any remotely located I/O devices that are interrupt driven;

generating and transmitting one or more reply packets that identify the remote I/O devices that are interrupt driven; and receiving and unwrapping the reply packets and generating an interrupt table for the identified remote I/O devices.

13. A method of processing a remote interrupt in a distributed computer system, the distributed computer system comprising a host computer and a plurality of remotely located I/O devices, each of the I/O devices coupled to the host computer via a network, said method comprising the steps of:

generating an interrupt at one of the remote I/O devices;

generating an interrupt packet;

transmitting the interrupt packet over the network to the host computer;

receiving and unwrapping the interrupt packet;

replaying the interrupt to the host computer in response to the unwrapped interrupt packet;

obtaining the address of an interrupt service routine associated with the interrupt;

the host computer issuing one or more host read transactions sent over the network to read pending interrupt registers in one or more of the remote I/O devices in order to identify the remote I/O device that issued the interrupt;

wrapping the values read from the pending interrupt registers in one or more reply packets and transmitting the reply packets over the network back to the host computer;

receiving and unwrapping the reply packets;

determining which I/O device issued the interrupt based on the values of the pending interrupt registers; and executing an interrupt service routine associated with the identified I/O device.

14. A distributed computer system comprising:

an I/O device to generate an interrupt;

a network/I/O bridge coupled to the I/O device via an I/O bus, said network/I/O bridge to detect the interrupt and generate and transmit an interrupt packet via a network;

a network/host bridge coupled to the network/I/O bridge via a network, said network/host bridge to detect an interrupt packet and output an interrupt in response thereto onto a host bus;

a host CPU coupled to the network/host bus via the host bus, said host CPU to acknowledge the interrupt and execute an interrupt service routine of the remote I/O device that generated the interrupt; and the network/host bridge to obtain information identifying the I/O device that generated the interrupt through one or more packets transmitted to or received from the network/I/O bridge.

15. A method comprising:

a host computer issuing one or more I/O bus scan transactions to identify one or more interrupt driven I/O devices which are coupled to the host computer via a network;

generating one or more query packets requesting an identification of any remotely located I/O devices that are interrupt driven in response to the bus scan transactions;

transmitting the one or more query packets over a network to one or more I/O devices in response to the one or more bus scan transactions;

generating one or more reply packets that identify the remote I/O devices that are interrupt driven in response to the one or more query packets;

transmitting the reply packets over the network to the host computer; and receiving and unwrapping the reply packets to identify the interrupt driven I/O devices.

16. The method of claim 15 and further comprising generating an interrupt table at the host computer for the identified remote interrupt driven I/O devices.

* * * * *

UNITED STATES PATENT AND TRADEMARK OFFICE
CERTIFICATE OF CORRECTION

PATENT NO.   : 6,170,025 B1
DATED        : January 2, 2001
INVENTOR(S)  : Ken Drottar et al.

It is certified that error appears in the above-identified patent and that said Letters Patent is hereby corrected as shown below:

<u>Title page,</u>
Item [56] insert "OTHER DOCUMENTS"
-- U.S. Patent Application Serial No. 08/934,640, entitled "Fast 16 Bit, Split Transaction I/O Bus," filed September 22, 1997.
U.S. Patent Application Serial No. 08/934,996, entitled "System and Method of Flow Control for a High Speed Bus," filed September 22, 1997.
U.S. Patent Application Serial No. 08/934,968, entitled "Method and Apparatus for Providing and Embedding Control Information in a Bus System," filed September 22, 1997. --

Signed and Sealed this

Fifth Day of February, 2002

*Attest:*

JAMES E. ROGAN
*Attesting Officer*   *Director of the United States Patent and Trademark Office*